(12) United States Patent
Yamamoto et al.

(10) Patent No.: US 8,523,964 B2
(45) Date of Patent: Sep. 3, 2013

(54) HYDROGEN GENERATING DEVICE AS WELL AS FUEL CELL POWER GENERATING DEVICE, ELECTRIC AUTOMOBILE, SUMBERGIBLE SHIP AND HYDROGEN SUPPLY SYSTEM USING THE SAME

(75) Inventors: Yoshihiro Yamamoto, Kyoto (JP); Ryoichi Okuyama, Kyoto (JP)

(73) Assignee: GS Yuasa International Ltd., Kyoto-Shi (JP)

( * ) Notice: Subject to any disclaimer, the term of this patent is extended or adjusted under 35 U.S.C. 154(b) by 1446 days.

(21) Appl. No.: 11/921,471

(22) PCT Filed: Jun. 2, 2006

(86) PCT No.: PCT/JP2006/311565
§ 371 (c)(1),
(2), (4) Date: Dec. 3, 2007

(87) PCT Pub. No.: WO2006/129885
PCT Pub. Date: Dec. 7, 2006

(65) Prior Publication Data
US 2009/0123801 A1    May 14, 2009

(30) Foreign Application Priority Data

Jun. 3, 2005   (JP) .................................. 2005-164145
Mar. 29, 2006  (JP) .................................. 2006-089998

(51) Int. Cl.
*H01M 8/18*    (2006.01)
(52) U.S. Cl.
USPC ............................................. 48/61; 429/423
(58) Field of Classification Search
USPC ............................................. 429/523; 48/61
See application file for complete search history.

(56) References Cited

U.S. PATENT DOCUMENTS

| 6,541,149 B1 * | 4/2003 | Maynard et al. ............... 429/535 |
| 2002/0192530 A1 * | 12/2002 | Kabumoto et al. .............. 429/38 |
| 2003/0121481 A1 * | 7/2003 | Dodd et al. ........................ 123/3 |
| 2004/0131902 A1 * | 7/2004 | Frank et al. ..................... 429/21 |
| 2007/0048593 A1 * | 3/2007 | Goebel et al. ................... 429/44 |

FOREIGN PATENT DOCUMENTS

| JP | S62-256976 | 11/1987 |
| JP | H11-229167 | 8/1999 |
| JP | 3328993 | 7/2002 |
| JP | 3360349 | 10/2002 |

OTHER PUBLICATIONS

Q. Ye et al., "Electrochemical Reactions in a DMFC under open-circuit conditions"; Electrochemical and Solid State Letters, vol. 8, No. 1, 2005 A52-A54.

* cited by examiner

*Primary Examiner* — Ula C. Roddock
*Assistant Examiner* — Frank Chernow
(74) *Attorney, Agent, or Firm* — Manabu Kanesaka

(57) ABSTRACT

A hydrogen generating device for generating a gas containing hydrogen by decomposing a fuel containing an organic compound which includes a partition membrane, a fuel electrode provided on one surface of the partition membrane, a fuel supply unit supplying a fuel containing organic compound and water to the fuel electrode, an oxidizing electrode provided on the other surface of the partition membrane, an oxidizing agent supply unit supplying an oxidizing agent to the oxidizing electrode, and a gas generating and collecting unit generating and collecting the gas containing hydrogen from the fuel electrode. A low oxidizing agent supply region where supply of the oxidizing agent is substantially lower than the other region is present on an oxidizing electrode side of the hydrogen generating device.

35 Claims, 17 Drawing Sheets (A) $CH_3OH + H_2O \rightarrow 6H^+ + 6e^- + CO_2$ (B) $6H^+ + 6e^- + 3/2 O_2 \rightarrow 3H_2O$ (C) $6H^+ + 6e^- \rightarrow 3H_2$ (D) $CH_3OH + H_2O \rightarrow 6H^+ + 6e^- + CO_2$ F I G. 17
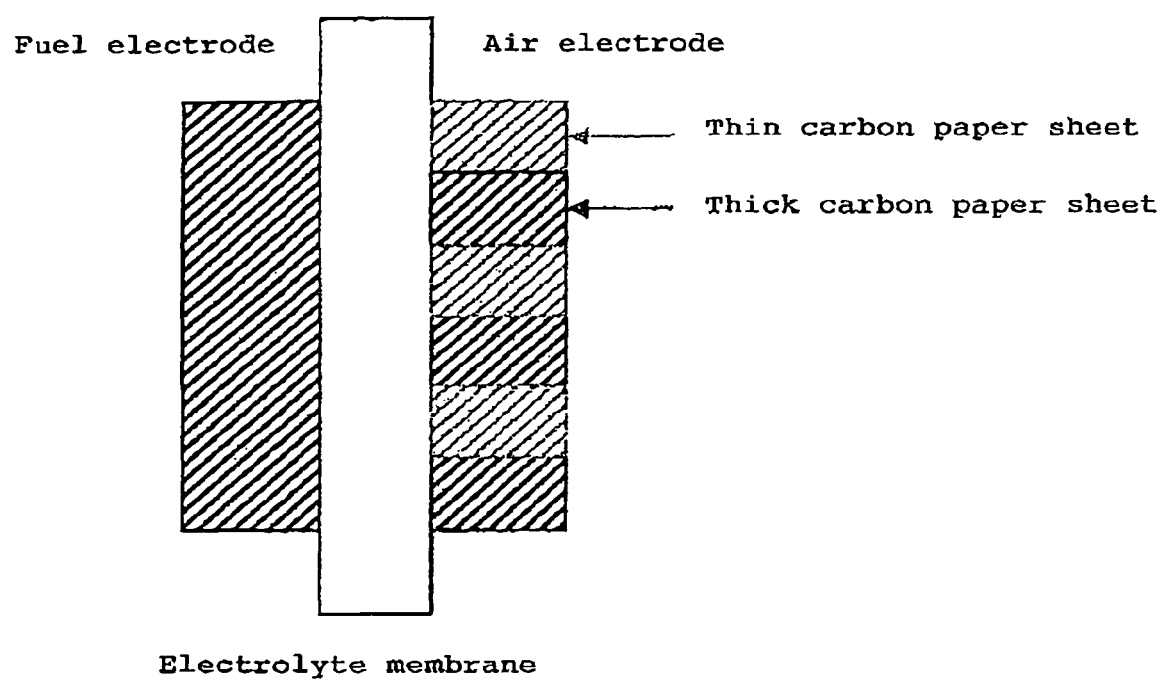

US 8,523,964 B2

HYDROGEN GENERATING DEVICE AS WELL AS FUEL CELL POWER GENERATING DEVICE, ELECTRIC AUTOMOBILE, SUMBERGIBLE SHIP AND HYDROGEN SUPPLY SYSTEM USING THE SAME

TECHNICAL FIELD

The present invention relates to a hydrogen generating device for generating a gas containing hydrogen by decomposing a fuel containing organic matters at a low temperature, as well as a fuel cell power generating device, an electric automobile, a submergible ship and a hydrogen supply system using the hydrogen generating device.

BACKGROUND ART

As technologies of generating a gas by decomposing a fuel containing organic matters at a low temperature there are known methods and devices for generating hydrogen by electrochemical reactions, and there are also known fuel cells using hydrogen generated by such electrochemical reactions (See Patent Documents 1 to 4).
Patent Document 1: JP-B-3328993
Patent Document 2: JP-B-3360349
Patent Document 3: U.S. Pat. Nos. 6,299,744, 6,368,492, 6,432,284, and 6,533,919, and U.S. Patent Application No. 2003/0226763
Patent Document 4: JP-A-2001-297779

Patent Document 1 cited above describes (Claim 1), "a method for generating hydrogen comprising providing a pair of electrodes on the two opposite surfaces of a cation exchange membrane, contacting a fuel containing at least methanol and water with one electrode having a catalyst, applying a voltage between the pair of electrodes so that electrons are withdrawn from the electrodes thereby causing a reaction to occur on the electrodes whereby hydrogen ions are generated from methanol and water, and allowing hydrogen ions to be converted on the other electrode, being supplied with electrons, into hydrogen molecules." The same patent document discloses another method (paragraphs [0033] to [0038]) for selectively generating hydrogen using a conversion system, the method comprising supplying water or water vapor together with methanol which serves as a fuel, applying a voltage via an external circuit to cause electrons to be withdrawn from a fuel electrode, so that reaction represented by $CH_3OH+2H_2O \rightarrow CO_2+6e^-+6H^+$ occurs on the fuel electrode, and allowing hydrogen ions thus produced to pass through a cation exchange membrane to reach the opposite electrode where the hydrogen ions undergo reaction represented by $6H^++6e^- \rightarrow 3H_2$. Patent Document 2 cited above describes (paragraphs [0052] to [0056]) a fuel cell which utilizes hydrogen generated by a method as described above.

According to the inventions described in Patent Document 1 (paragraph [0042]) and Patent Document 2 (paragraph [0080]) cited above, it is possible to generate hydrogen at a low temperature. However, the methods described in those inventions are obviously different from the hydrogen generating device of the present invention which will be given below in following points: those methods require the application of voltage, and hydrogen is generated on the electrode opposite to the electrode (fuel electrode) to which fuel is supplied, and no oxidizing agent is supplied to the opposite electrode.

This holds true also for the inventions disclosed by Patent Document 3 cited above similarly to Patent Documents 1 and 2 cited above. Those inventions use a system for generating hydrogen where protons generated on anode 112 serving as fuel electrode pass through partition membrane 110 to reach cathode 114 opposite to the anode, and according to the system, voltage from DC power source 120 is provided between anode (fuel electrode) and cathode (opposite electrode) to supply organic fuel such as methanol or the like to the anode 112 for electrolysis. In addition, hydrogen is generated on the electrode opposite to the fuel electrode, and no oxidizing agent is supplied to the opposite electrode.

Patent Document 4 cited above discloses a fuel cell system incorporating a hydrogen generating electrode for generating hydrogen (Claim 1). According to the disclosure of the invention, "Liquid fuel containing alcohol and water is supplied to porous electrode 1 (fuel electrode), air is supplied to gas diffusion electrode 2 (oxidizing agent-applied electrode) opposite to electrode 1, and a load is inserted between a terminal leading to porous electrode 1 and another terminal leading to gas diffusion electrode 2 to achieve electric connection allowing a positive voltage to be applied to porous electrode 1 via the load from gas diffusion electrode 2 which corresponds to the positive electrode of MEA2 capable of acting as a conventional fuel cell." The same patent document further adds (paragraph [0007]), "As a result, alcohol reacts with water to produce carbon dioxide gas and hydrogen ion, the hydrogen ion passes through an electrolyte membrane 5 to reach a gas diffusion electrode 6 located centrally where the hydrogen ion is converted into hydrogen gas. On the opposite surface of gas diffusion electrode 6 in contact with another electrolyte layer 7, there arises another electrode reaction where hydrogen gas is reconverted into hydrogen ion, and hydrogen ions migrate through electrolyte layer 7 to reach another gas diffusion electrode 2 where hydrogen ions react with oxygen in air to produce water." Thus, with this system, electric energy generated by a fuel cell is utilized to generate hydrogen on the hydrogen generating electrode (gas diffusion electrode 6) which is then supplied to the fuel cell. Moreover, the system is the same with those described in the patent documents 1 to 3 cited above in that hydrogen is generated on the electrode opposite to the fuel electrode.

There are some other known methods for oxidizing alcohol (methanol) (See Patent Documents 5 and 6). According to the inventions, a reaction system with a partition membrane is used where anode (electrode A) and cathode (electrode B) are placed opposite to each other with a proton conducting membrane (ion conductor) inserted therebetween, and where alcohol (methanol) is oxidized with or without concomitant application of voltage, or with concomitant uptake of electric energy. All those methods, however, are based on a method whereby alcohol is oxidized by means of an electrochemical cell (the reaction product includes carbonic diester, formalin, methyl formate, dimethoxymethane, etc.), and not on a method whereby alcohol is converted by reduction into hydrogen."
Patent Document 5: JP-A-06-73582 (Claims 1 to 3, Paragraph [0050])
Patent Document 6: JP-A-06-73583 (Claims 1 and 8, Paragraphs [0006] and [0019])

Further, Non-Patent Documents 1 and 2 describe that in case of open-circuit and insufficient oxygen conditions for a direct methanol type fuel cell (DMFC), a galvanic reaction and an electrolytic reaction coexist in a single cell, a reaction represented by $CH_3OH+2H_2O \rightarrow CO_2+6e^-+6H^+$ occurs on the oxidizing electrode and a reaction represented by $6H^++6e^- \rightarrow 3H_2$ occurs on the fuel electrode, and hydrogen is generated on the fuel electrode side. However, the article of Non-patent Document 1 concludes that "the generation of hydrogen not only decreases the output of electrical power for running cells, but also continuously consumes fuel under open-circuit condition. Thus, it is important to maintain adequate and constant supply of oxygen to a cathode both the DMFC is in operation and in standby state." The article of Non-patent Document 2 concludes that "For a DMFC having a large MEA area, attention must be given to the accumulation of hydrogen caused by shutdown and startup of the system." Accordingly, both articles do not intend to generate hydrogen.

Non-Patent Document 1: Electrochemical and Solid-State Letters, 8(1) A52-A54 (2005)
Non-Patent Document 2: Electrochemical and Solid-State Letters, 8(4) A211-A214 (2005)

Recently, generating devices (power source devices) incorporating a fuel cell, giving consideration to environment problems, have been proposed, and when the fuel cell power generating device is used as a mobile power source or an on-site power source, a package-type fuel cell power generating device in which equipments constituting the generating device are integrated and stored in a single metal package is used in order to facilitate its transportation and installation. In this type of fuel cell power generating device, when a hydrocarbon fuel such as utility gas is used as a raw fuel, for example, a fuel reforming device for reforming it to a fuel mainly made of hydrogen is incorporated in a single package (unit case). In the package (unit case), a fuel cell itself, a power converting device for converting a direct-current power generated by the fuel cell to a power-source output specification, a control device for entire control, auxiliary machines such as a pump and a fan provided in relation with the fuel cell (See Patent Documents 7 to 11, for example).

Patent Document 7: JP-A-05-290868
Patent Document 8: JP-A-10-284105
Patent Document 9: JP-A-2002-170591
Patent Document 10: JP-A-2003-217635
Patent Document 11: JP-A-2003-297409

The fuel reforming device includes a reformer, a CO transformer, and a CO remover, and predetermined catalysts are filled in each of the equipments, and since catalysts act at a high temperature it is required to be heated. Therefore, a burner is also provided at the reformer and an original fuel is burned by the burner at start so as to raise the temperature of the catalyst in the reformer to approximately 650 to 700° C. Also, with the temperature rise of the reformer, the temperatures of the catalysts of the CO transformer and the CO remover are also gradually raised, but since the reformed gas at start is not stable, it is not supplied to the fuel cell immediately, it is fed to a PG burner to be burned before being supplied to the fuel cell (Patent Document 11, Paragraph [0003]).

On the other hand, since the control device is constituted by a large number of electronic parts, they should be protected from high heat generated by the fuel reforming device. Thus, a technology to provide an insulating bulkhead between the fuel reforming device and the control device as in Patent Documents 7 and 9, a technology for cooling the control device by forced ventilation inside the package using a blower or a ventilation fan as in Patent Documents 7 and 8, and a technology to arrange the control device so that it is not affected by heat of the fuel reforming device as in Patent Documents 10 and 11 are developed.

As mentioned above, when the conventional fuel reforming device is used, there is a problem that various devices should be used in order to prevent its thermal influence.

Also, such a package-type fuel cell power generating device not using a high-temperature fuel reforming device is known in which a cylinder filled with hydrogen storage alloy (hydrogen storage cylinder) and a fuel cell are integrated (See Patent Documents 12 and 13, for example).

Patent Document 12: JP-A-06-60894
Patent Document 13: JP-A-10-92456

The fuel cell power generating device in Patent Documents 12 and 13 does not need means for preventing thermal influence as in the case that a conventional fuel reforming device is used, but since a hydrogen emission process of the hydrogen storage alloy is a heat absorbing reaction, the temperature of the hydrogen storage alloy is lowered when a hydrogen fuel is supplied, and since a hydrogen emitting capability of the hydrogen storage alloy is lowered with lowering of the temperature, it is necessary to heat the hydrogen storage alloy by guiding a generated heat at the fuel cell itself to a hydrogen storage cylinder in order to ensure a sufficient hydrogen flow rate, and also there is a problem that a generating time is limited since the cylinder is used.

Moreover, an electric automobile provided with a fuel cell as a power source to obtain the driving power is known on which methanol or the like is loaded as a raw fuel as well as a reformer for reforming the raw fuel to perform a reforming reaction for generating a gas containing hydrogen is loaded (See Patent Documents 14 to 17, for example). When liquid fuel such as methanol is particularly used as a raw fuel, such an electric automobile loading the raw fuel and the reformer thereon has a merit that a travel distance which can be covered by the electric automobile by one fuel replenishment is longer than a case where a gas fuel is loaded. Moreover, the raw fuel such as methanol or hydrocarbon has a merit that it is easily and safely handled at the time of transportation as compared with hydrogen gas.

Patent Document 14: JP-A-2000-149974
Patent Document 15: JP-A-2001-113960
Patent Document 16: JP-A-2001-202980
Patent Document 17: JP-A-2001-298807

However, with regard to a reformer in the case where methanol, dimethyl ether (DME), ethanol, natural gas, propane, gasoline, etc. is loaded on an electric automobile as a raw fuel, development of a methanol reformer with the lowest reforming temperature is most advanced, and currently, three reforming methods are employed therefor: steam reforming, partial oxidation reforming and combined use of the both (See Non-patent Document 3). However, any of the reforming methods require reforming performed at a high temperature of 200° C. or more in order to manufacture gas containing hydrogen, and there are problems of poisoning of a reforming catalyst, removal of CO contained in the reformed gas (gas containing hydrogen), mixing of nitrogen in the air into the reformed gas obtained by partial oxidation reforming or combined reforming.

Non-Patent Document 3: "Development and Practical Application of Solid Polymer Type Fuel Cell", pp. 141 to 166, May 28, 1999, issued by Technical information Institute, Co., Ltd.

On the other hand, there has been developed an electric automobile (fuel cell automobile) incorporating a container which stores hydrogen in the form of hydrogen gas or a hydrogen storage alloy. However, a major problem in expanding use of this electric automobile is improvement of hydrogen supply infrastructure. That is, there is a problem of how to improve the hydrogen supply infrastructure of wide-area for fuel cell automobiles that run freely. Thus, due to the merit of being capable of utilizing the existing infrastructures such as utility gas grids, gas stations and the like, systems for subjecting utility gas or liquid fuel (desulfurized naphtha, gasoline, kerosene, light oil, methanol or the like) to steam reforming by a reformer at a hydrogen supply station to generate hydrogen, storing the generated hydrogen in a hydrogen storage tank and supplying the hydrogen to a hydrogen storage container in a fuel cell automobile are most developed (See Patent Documents 18 to 21, for example).

However, the above-described hydrogen supply systems have problems that the reforming device is expensive, has a large device size and is accompanied by complicated maintenance and operation of device requiring sophisticated skills.

Patent Document 18: JP-A-2002-315111
Patent Document 19: JP-A-2002-337999
Patent Document 20: JP-A-2003-118548
Patent Document 21: JP-A-2004-79262

There have also been developed systems for generating hydrogen by electrolyzing water, storing the generated hydrogen in a hydrogen storage tank and supplying this hydrogen to a hydrogen storage container in a fuel cell automobile instead of reforming a fuel containing organic matters as described above (See Patent Documents 22 and 23, for example).

These systems require no such high temperature for reforming a fuel containing organic matters, however, they have a problem of requiring a large amount of electric power.

Patent Document 22: JP-A-2002-161998
Patent Document 23: JP-A-2002-363779

In a conventional submergible ship provided with a fuel cell as a power source to obtain the driving force, a method for storing hydrogen in the form of high-pressure hydrogen gas and supplying the hydrogen to the fuel cell is generally employed (See Patent Documents 24 to 26, for example). In this method, the gas container must be pressure-resistant, and therefore, the mass of the container becomes larger. When a submergible ship is heavy in weight, floating buoyant materials corresponding to the increased weight are required. Consequently, there occurs a problem that the submergible ship becomes larger due to the provision of the floating buoyant materials. Moreover, since hydrogen is stored in the form of a high-pressure gas, there is also a problem that attention must be paid to safety and handling of hydrogen is difficult.

Patent Document 24: JP-A-10-100990
Patent Document 25: JP-A-10-144327
Patent Document 26: JP-A-10-181685

To solve the above-described problems, there has been developed "a hydrogen generating device for submergible machine (including submergible ship) which generates hydrogen by bringing a metal hydroxide (including a complex metal hydroxide) into contact with a hydrogen generation accelerator among hydrogen supply and generation devices used as a power source of a submergible machine, characterized in that at least one of the metal hydroxide and the hydrogen generation accelerator is liquid, a container in which the liquid metal hydroxide or liquid hydrogen generation accelerator is stored is arranged in the submergible machine, and the pressure in the container is substantially equalized with the water pressure outside the machine" (See Patent Document 27). Although the metal hydroxide used in this hydrogen generating device can be handled easier than high-pressure hydrogen gas, it has a strong reactivity different from fuel containing organic matters as a hydrogen raw material. Thus, measures are required for preventing contact with water or alcohol that is a hydrogen generation accelerator and reaction control is difficult.

Patent Document 27: JP-A-2002-187595

It is also known that a reformer which reforms a hydrocarbon fuel to generate hydrogen is mounted on a submergible machine and the hydrogen generated by the reformer is supplied to a fuel cell (See Patent Document 28, for example). In this case, however, there are problems similar to those in the above-described electric automobile.

Patent Document 28; JP-A-08-17456

DISCLOSURE OF INVENTION

Problems to be Solved by the Invention

The present invention has been made in view of the above problems and an object of the invention is to provide a hydrogen generating device capable of generating a gas containing hydrogen at a low temperature, and a fuel cell power generating device, an electric automobile, a submergible ship and a hydrogen supply system using the hydrogen generating device.

Means for solving the Problems

Proposed to give a solution to the problems, the present invention employs the following means:

(1) A hydrogen generating device for generating a gas containing hydrogen by decomposing a fuel containing an organic compound, characterized by including: a partition membrane; a fuel electrode provided on one surface of the partition membrane; a means for supplying a fuel containing the organic compound and water to the fuel electrode; an oxidizing electrode provided on the other surface of the partition membrane; a means for supplying an oxidizing agent to the oxidizing electrode; and a means for generating and collecting the gas containing hydrogen from the fuel electrode, and further a region of insufficient oxidizing agent supply is provided on the oxidizing electrode side.

(2) The hydrogen generating device according to the above (1), characterized in that the region of insufficient oxidizing agent supply is provided without using an oxidizing electrode separator provided with a channel groove for flowing the oxidizing agent therethrough.

(3) The hydrogen generating device according to the above (1) or (2), characterized in that the region of insufficient oxidizing agent supply is provided on the gas diffusion layer of the oxidizing electrode.

(4) The hydrogen generating device according to the above (3), characterized in that the region of insufficient oxidizing agent supply is provided by performing masking on part of the gas diffusion layer of the oxidizing electrode.

(5) The hydrogen generating device according to the above (1) or (2), characterized in that the region of insufficient oxidizing agent supply is provided by performing masking on part of only the gas diffusion layer of the fuel electrode.

(6) The hydrogen generating device according to any one of the above (1) to (4), characterized in that the region of insufficient oxidizing agent supply is provided not only by performing masking on parts of the gas diffusion layers of both oxidizing electrode and the fuel electrode, but also by displacing at least parts of the masked regions from each other on the opposing both surfaces.

(7) The hydrogen generating device according to any one of the above (4) to (6), characterized in that the masking is performed to form a strip-shaped mask.

(8) The hydrogen generating device according to any one of the above (4) to (6), characterized in that the masking is performed to form a spot-shaped mask.

(9) The hydrogen generating device according to any one of the above (4) to (8), characterized in that the masking is performed by impregnating the gas diffusion layer with a resin or by applying a resin on the surface of the gas diffusion layer.

(10) The hydrogen generating device according to any one of the above (4) to (9), characterized in that the masking is performed by screen printing.

(11) The hydrogen generating device according to the above (3), characterized in that the region of insufficient oxidizing agent supply is provided by forming the gas diffusion layer of the oxidizing electrode inhomogeneous.

(12) The hydrogen generating device according to the above (11), characterized in that the gas diffusion layer of the oxidizing electrode is sparsely and densely formed or are used in combination with different materials to make the gas diffusion layer inhomogeneous.

(13) The hydrogen generating device according to the above (11) or (12), characterized in that irregularities are formed on the surface of the gas diffusion layer of the oxidizing electrode to make the gas diffusion layer of the oxidizing electrode inhomogeneous.

(14) The hydrogen generating device according to any one of the above (1) to (13), characterized in that the device is an open circuit having neither means for withdrawing electric energy to outside from a hydrogen generating cell constituting the hydrogen generating device, nor means for providing electric energy from outside to the hydrogen generating cell.

(15) The hydrogen generating device according to any one of the above (1) to (13), characterized in that the device has a means for withdrawing electric energy to outside with the fuel electrode serving as a negative electrode and the oxidizing electrode as a positive electrode.

(16) The hydrogen generating device according to any one of the above (1) to (13), characterized in that the device has a means for providing electric energy from outside with the fuel electrode serving as cathode and the oxidizing electrode as anode.

(17) The hydrogen generating device according to any one of the above (1) to (16), characterized in that voltage between the fuel electrode and the oxidizing electrode is 400 to 600 mV.

(18) The hydrogen generating device according to any one of the above (1) to (17), characterized in that the evolution volume of the hydrogen-containing gas is adjusted by varying the voltage between the fuel electrode and the oxidizing electrode.

(19) The hydrogen generating device according to any one of the above (1) to (18), characterized in that the voltage between the fuel electrode and the oxidizing electrode and/or the evolution volume of the hydrogen-containing gas are/is adjusted by varying the volume of oxidizing agent supply.

(20) The hydrogen generating device according to any one of the above (1) to (19), characterized in that the operation temperature is 100° C. or lower.

(21) The hydrogen generating device according to any one of the above (1) to (20), characterized in that the organic compound supplied to the fuel electrode is one or more organic compound selected from a group consisting of alcohol, aldehyde, carboxylic acid and ether.

(22) The hydrogen generating device according to the above (21), characterized in that the alcohol is methanol.

(23) The hydrogen generating device according to any one of the above (1) to (22), characterized in that the oxidizing agent supplied to the oxidizing electrode is an oxygen-containing gas or oxygen.

(24) The hydrogen generating device according to any one of the above (1) to (23), characterized in that the partition membrane is a proton conducting solid electrolyte membrane.

(25) The hydrogen generating device according to the above (24), characterized in that the proton conducting solid electrolyte membrane is a perfluorocarbon sulfonate-based solid electrolyte membrane.

(26) The hydrogen generating device according to any one of the above (1) to (25), characterized in that a catalyst of the fuel electrode is made of platinum-ruthenium alloy supported by carbon powder serving as a base.

(27) The hydrogen generating device according to any one of the above (1) to (26), characterized in that a catalyst of the oxidizing electrode is made of platinum supported by carbon powder serving as a base.

(28) The hydrogen generating device according to any one of the above (1) to (27), characterized in that a means for circulating fuel containing the organic compound is provided.

(29) The hydrogen generating device according to any one of the above (1) to (28), characterized in that a carbon dioxide absorbing portion for absorbing carbon dioxide contained in the hydrogen-containing gas is provided.

(30) A hydrogen generating device, characterized in that electric energy supplied to auxiliary machines for operating the hydrogen generating device is obtained from a fuel cell by connecting the fuel cell to the hydrogen generating device according to any one of the above (1) to (29).

(31) A fuel cell power generating device, characterized in that a gas containing hydrogen generated by a hydrogen generating device is supplied to a fuel cell by connecting the fuel cell to the hydrogen generating device according to any one of the above (1) to (30).

(32) The fuel cell power generating device according to the above (31), characterized in that, at least a fuel cell, a hydrogen generating device for generating a gas containing hydrogen to be supplied to the fuel cell, a power converting device for converting a direct-current power generated by the fuel cell to a predetermined power, and a control device for control of an entire generating device are incorporated in a package.

(33) The fuel cell power generating device according to the above (31) or (32), characterized in that the hydrogen-containing gas generated from the hydrogen generating device is supplied to the fuel cell without being cooled.

(34) The fuel cell power generating device according to any one of the above (31) to (33), characterized in that two or more of hydrogen generating devices selected from a group consisting of: a hydrogen generating device which is an open circuit having neither means for withdrawing electric energy to outside from a hydrogen generating cell, nor means for providing electric energy from outside to the hydrogen generating cell; a hydrogen generating device having a means for withdrawing electric energy to outside with the fuel electrode serving as a negative electrode and the oxidizing electrode as a positive electrode; and a hydrogen generating device having a means for providing electric energy from outside with the fuel electrode serving as cathode and the oxidizing electrode as anode, are used in combination.

(35) The fuel cell power generating device according to any one of the above (31) to (34), characterized in that the oxidizing agent supplied to the oxidizing electrode of the hydrogen generating device is exhaust air exhausted from the fuel cell or the hydrogen generating device or a gas containing unreacted oxygen (oxygen off-gas).

(36) The fuel cell power generating device according to any one of the above (31) to (35), characterized in that an insulating material for insulating a heat generated by the hydrogen generating device is not provided.

(37) An electric automobile, characterized in that a fuel cell power generating device according to any one of (31) to (36) is incorporated.

(38) A submergible ship, characterized in that a fuel cell power generating device according to any one of (31) to (36) is incorporated.

(39) A hydrogen supply system, characterized in that, by connecting a hydrogen generating device according to any one of the above (1) to (30) to hydrogen storage means, hydrogen-containing gas generated by the hydrogen generating device is supplied to the hydrogen storage means.

(40) The hydrogen supply system according to the above (39), characterized in that the hydrogen storage means is a hydrogen storage container incorporated in an electric automobile (fuel cell automobile).

Here, a term, "a region of insufficient oxidizing agent supply is provided on the oxidizing electrode side." in the above (1) means that a region of insufficient oxidizing agent supply is provided so that a discharge reaction may be suppressed and a hydrogen generation reaction may occur on the oxidizing electrode side. The term includes, however not limited to, a case of performing masking on part of the gas diffusion layer of the oxidizing electrode as in the above (4) and (6), or a case of directly providing a region of insufficient oxidizing agent supply on the gas diffusion layer of the oxidizing electrode (See above (3)) by forming the gas diffusion layer of the oxidizing electrode sparsely and densely, using different materials in combination, or forming irregularities on the surface thereof to make the gas diffusion layer of the oxidizing electrode inhomogeneous as in the above (11) to (13), also includes a case of indirectly providing a region of insufficient oxidizing agent supply on the oxidizing electrode side by performing masking on part of only the gas diffusion layer of the fuel electrode or the like as in the above (5).

The shape of masking can be a strip-shaped or a spot-shaped as in the above (7) and (8), material for the masking can be a resin as in the above (9), and means for masking can be impregnating, coating or screen printing as in the above (9) and (10). However, the shape of masking, the material and the means for masking are not limited thereto and may include any shape, material and means as long as a region of insufficient oxidizing supply can be formed on the oxidizing electrode side.

Moreover, "without using an oxidizing electrode separator provided with a channel groove for flowing the oxidizing agent" in the above (2) means that an oxidizing electrode separator provided with a channel groove for flowing an oxidizing agent (air) as seen in the conventional direct methanol type fuel cell is not used.

Further, the hydrogen generating device in the above (1), (14) to (16) has the means for supplying the fuel and the oxidizing agent to a hydrogen generating cell. Besides that, in the case of the above (15), the discharge control means for withdrawing electric energy from the hydrogen generating cell is provided, and in the case of the above (16), the electrolyte means for providing electric energy to the hydrogen generating cell is provided. The case of the above (14) is an open circuit having neither discharge control means for withdrawing electric energy from the hydrogen generating cell, nor electrolyte means for providing electric energy to the hydrogen generating cell. And the hydrogen generating device in the above (1) includes the hydrogen generating devices in the above (14) to (16). Moreover, these hydrogen generating devices have a function to control the supply volume or concentration of the fuel and the oxidizing agent and the electric energy to be withdrawn (in the case of the above (15)) or the electric energy to be provided (in the case of the above (16)) by monitoring the voltage of the hydrogen generating cell and/or the evolution volume of hydrogen-containing gas. The basic construction of the hydrogen generating cell constituting the hydrogen generating device is that the fuel electrode is provided on one surface of the partition membrane, a structure for supplying the fuel to the fuel electrode, while the oxidizing electrode is provided on the other surface of the partition membrane, a structure for supplying the oxidizing agent to the oxidizing electrode.

In the present invention, the electric automobile (fuel cell automobile) is not limited to one that obtains the driving force only from the fuel cell and may include hybrid vehicle using another power source in combination with the fuel cell.

Advantages of the Invention

Since the hydrogen generating device of the present invention can reform the fuel at 100° C. or less from a room temperature, which is extremely lower than the conventional reforming temperature, both energy amount required for reforming and time required for start can be reduced. Besides that, an insulating material for insulating heat generated by the reforming device can be made unnecessary in a fuel cell power generating device using the hydrogen generating device, an electric automobile and a submergible ship in which the fuel cell power generating device is incorporated, and a hydrogen supply system using the hydrogen generating device, and a hydrogen-containing gas generated from the hydrogen generating device can be easily supplied to the fuel cell without being cooled.

Moreover, since the hydrogen-containing gas generated from the hydrogen generating device does not contain or contain very small amount of nitrogen and does not contain CO, gas with comparatively high hydrogen concentration can be obtained and a CO removing process is not needed.

The hydrogen generating device of the present invention can generate hydrogen without supplying the electric energy from outside to the hydrogen generating cell, but even if the means for withdrawing electric energy to the outside is provided, or the means for providing electric energy from the outside is provided, hydrogen can be generated.

If the means for withdrawing electric energy is provided, electric energy can be effectively used.

Even if the means for providing the electric energy from the outside is provided, by supplying a small amount of electric energy from the outside to the hydrogen generating cell, hydrogen larger than the inputted electric energy can be generated, which is another effect.

Moreover, in any case, a process control is made possible by monitoring the voltage of the hydrogen generating cell and/or the evolution volume of the hydrogen-containing gas, the size of the hydrogen generating device can be reduced, which can also reduce the manufacturing costs of the hydrogen generating device, the fuel cell power generating device, the electric automobile, the submersible ship and the hydrogen supply system.

If separator is not used, the size of the hydrogen generating device can be further reduced, which is another effect

BRIEF DESCRIPTION OF THE DRAWINGS

FIG. 17 is a schematic diagram for showing an example of forming sparse and dense regions in combination to make the gas diffusion layer of the air electrode inhomogeneous.

EXPLANATION OF REFERENCE SYMBOLS

Figure 1:
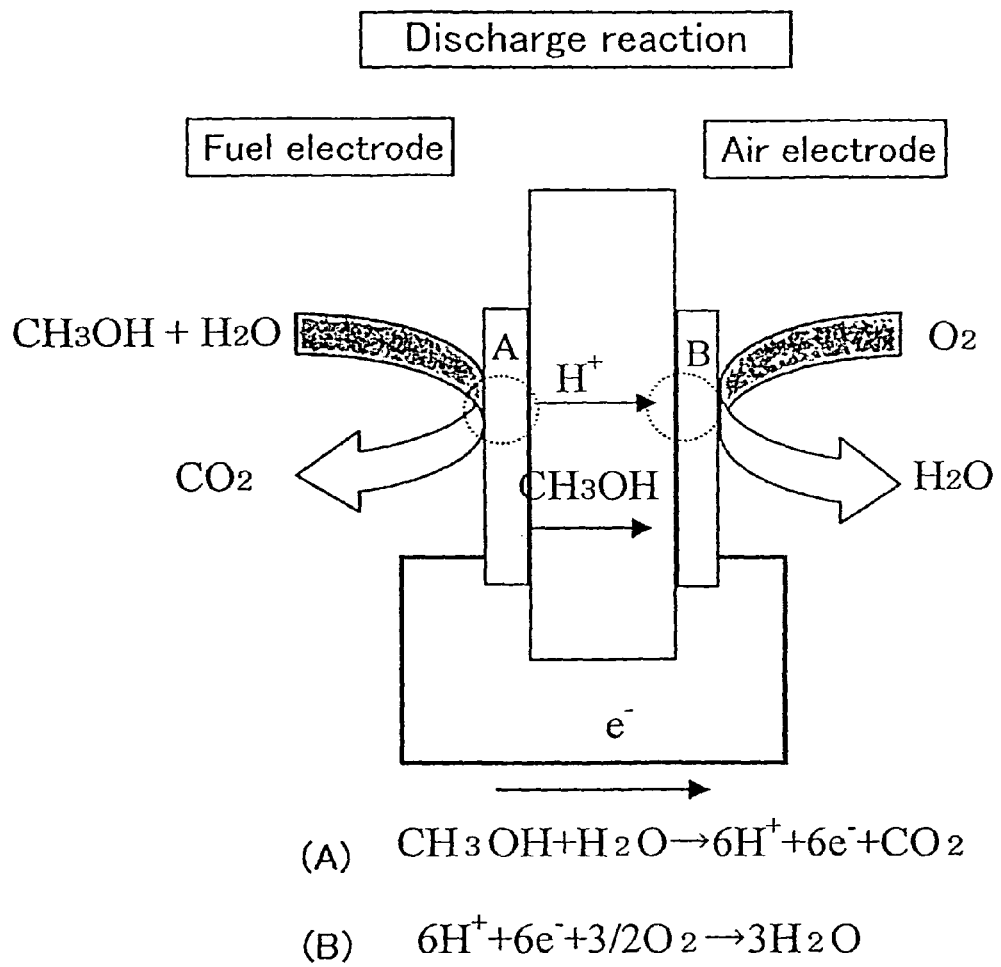
FIG. 1 is a schematic diagram for showing a reaction in a discharge region of a fuel electrode and an air electrode of a hydrogen generating device of the present invention.

10: Hydrogen generating cell
11: Partition membrane
12: Fuel electrode
13: Feed channel through which a fuel containing organic matters and water (aqueous solution of methanol) is supplied to fuel electrode 12
14: Oxidizing electrode (air electrode)
15: Feed channel through which an oxidizing agent (air) is supplied to oxidizing electrode (air electrode) 14
16: Fuel pump
17: Air blower
18: Fuel flow control valve
19: Air flow control valve
20: Fuel tank
21: Fuel control vessel
22: Voltage controller
23: Gas/liquid separator (for separating hydrogen-containing gas from unreacted aqueous solution of methanol)
24: Hydrogen tank
25: Guide tube for returning unreacted aqueous solution of methanol to fuel control vessel 21
26: Hydrogen flow control valve
27: Gas/liquid separator (for separating generated water and unreacted aqueous solution of methanol from exhaust air)
28: Carbon dioxide removing device
29: Guide tube for returning unreacted aqueous solution of methanol to fuel control vessel 21
30: Fuel cell
31: Solid polymer electrolyte membrane
32: Hydrogen electrode
33: Feed channel through which hydrogen is supplied to hydrogen electrode 32
34: Air electrode
35: Feed channel through which air is supplied to air electrode 34
36: Power converting device for converting direct-current power generated by fuel cell 30 to a predetermined power
37: Control device for controlling the entire generating device
38: Package

BEST MODE FOR CARRYING OUT THE INVENTION

The most preferred embodiments in execution of the present invention will be illustrated below The hydrogen generating device of the invention is basically novel, and the embodiments thereof described herein are given only for the illustrate representation of the present invention, and not for limiting the scope of the invention.

The present inventor et al. have developed a hydrogen generating device for generating a gas containing hydrogen by decomposing a fuel containing an organic compound using a cell having a similar structure as that of the conventional direct methanol type fuel cell (JP-A-2004-367792). The present inventor et al. have further developed a stand-alone hydrogen generating system (JP-A-2005-151125), a fuel cell power generation device (JP-A-2005-151124), an electric automobile (JP-A-2005-096955), a hydrogen supply system (JP-A-2005-096956) and a submergible ship (JP-A-2005-096957) by applying the hydrogen generating device.

The hydrogen generating devices of the above inventions use an oxidizing electrode separator provided with a channel groove for flowing an oxidizing agent. However, the present inventor et al. have found that hydrogen is generated by providing a region of insufficient oxidizing agent supply on the oxidizing electrode side without using a separator, thereby achieving the present invention.

The hydrogen generating device of the present invention for generating a gas containing hydrogen by decomposing a fuel containing an organic compound has a partition membrane; a fuel electrode provided on one surface of the partition membrane; a means for supplying a fuel containing the organic compound and water to the fuel electrode; an oxidizing electrode provided on the other surface of the partition membrane; a means for supplying an oxidizing agent to the oxidizing electrode; and a means for generating and collecting the gas containing hydrogen from the fuel electrode, and further a region of insufficient oxidizing agent supply is provided on the oxidizing electrode side.

The hydrogen generation reaction mechanism in the hydrogen generating device of the present invention is estimated as follows:

In a region of sufficient oxidizing agent supply (hereinafter, referred to as "discharge region") provided on the oxidizing electrode (air electrode) side, there occur normal discharge reactions in the fuel cell, that is, as shown in FIG. 1, a reaction (A) occurs on the fuel electrode side and a reaction (B) occurs on the air electrode side.

$$CH_3OH+H_2O \rightarrow 6H^+ +6e^- +CO_2 \quad (A)$$

$$6H^+ +6e^- +\tfrac{3}{2}O_2 \rightarrow 3H_2O \quad (B)$$

Figure 2:
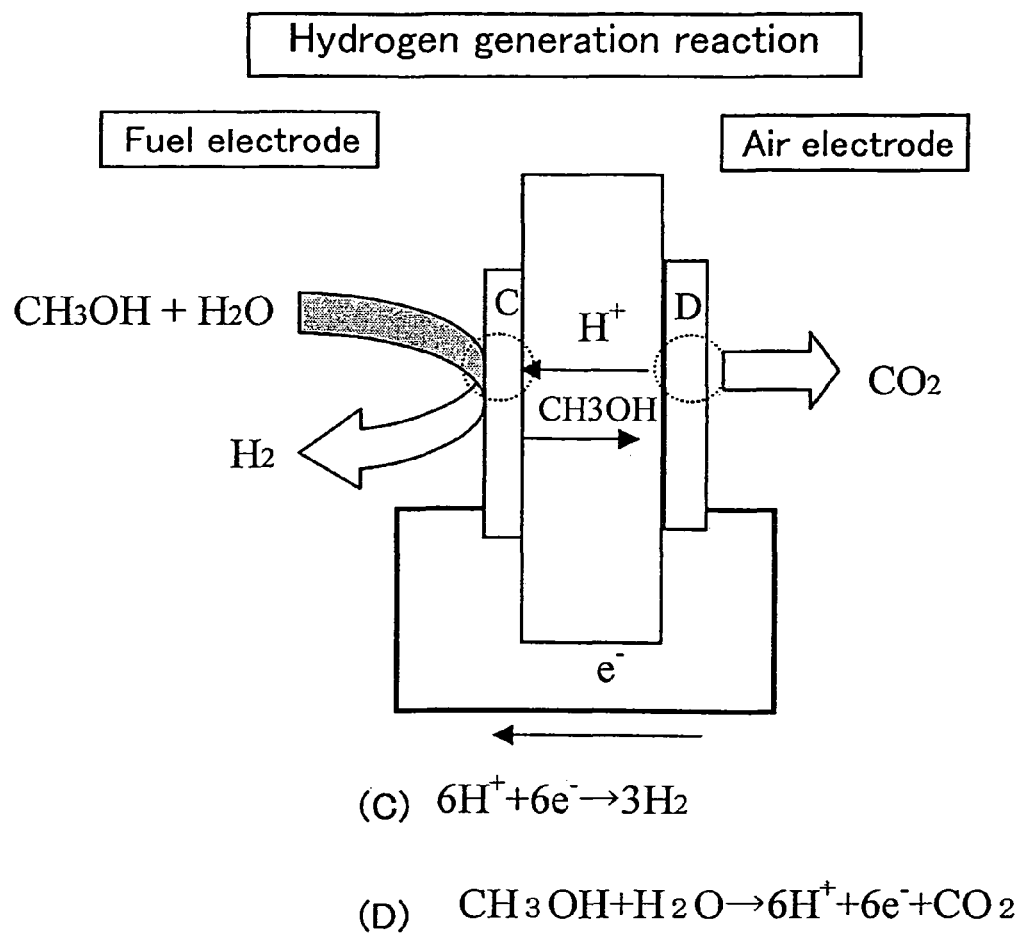
FIG. 2 is a schematic diagram for showing a reaction in a hydrogen generation region of the fuel electrode and the air electrode of the hydrogen generating device of the present invention.

On the other hand, if a proton conducting solid electrolyte membrane such as Nafion is used, there has been known a phenomenon called crossover, that is, the crossover of $CH_3OH$ from the fuel electrode to the air electrode. In a region or insufficient oxygen supply provided on the air electrode side (hereinafter, referred to as "hydrogen generation region"), reaction represented by formula (B) does not occur and, as shown in FIG. 2, crossover methanol is oxidized by electrolysis and a reaction represented by formula (D) occurs. On the other hand, on the fuel electrode side, a hydrogen generation reaction represented by formula (C) occurs.

$$6H^+ +6e^- \rightarrow 3H_2 \quad (C)$$

$$CH_3OH+H_2O \rightarrow 6H^+ +6e^- +CO_2 \quad (D)$$

With regard to the hydrogen generating device according to Claim 14 of the present invention (hereinafter, referred to as "open-circuit condition"), since $e^-$ generated by the reactions represented by formulas (A) and (D) is not supplied to the opposite electrode via the external circuit, the movement of $H^+$ and $e^-$ generated by the reaction represented by formula (A) on the fuel electrode to the air electrode and the movement of $H^+$ and $e^-$ generated by the reaction represented by formula (D) on the air electrode to the fuel electrode are considered to be apparently negated.

Figure 3:
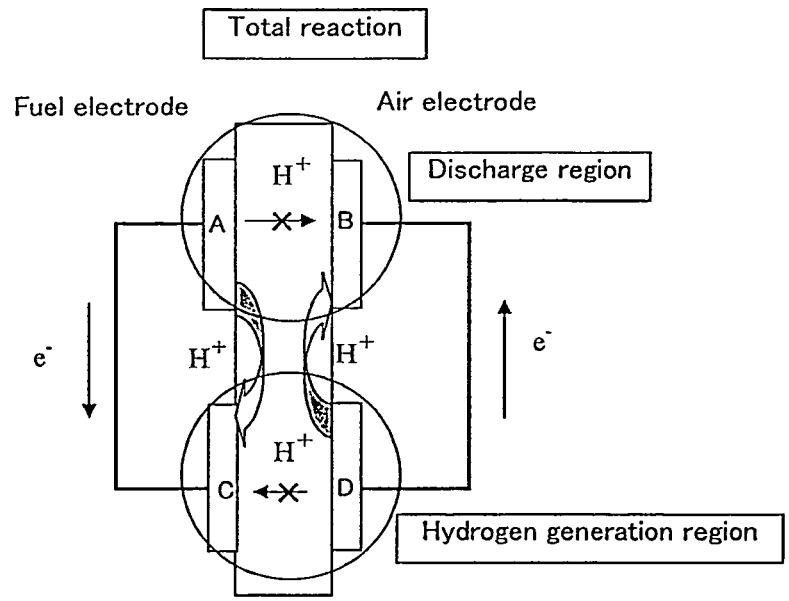
FIG. 3 is a schematic diagram for showing a total reaction on the fuel electrode and the air electrode of the hydrogen generating device of the present invention.

That is, as shown in FIG. 3, it is presumed that $H^+$ and $e^-$ generated by the reaction represented by formula (A) in the discharge region of the fuel electrode side move to the hydrogen generation region of the same fuel electrode side, thereby causing the reaction represented by formula (C) and generating hydrogen, and that, on the other hand, $H^+$ and $e^-$ generated by the reaction represented by formula (D) in the hydrogen generation region of the air electrode side move to the discharge region of the same air electrode side, thereby causing the reaction represented by formula (B).

Assumed that reactions represented by formulas (A) and (C) proceed on the fuel electrode while reactions represented by formulas (B) and (D) proceed on the oxidizing electrode, the net balance of chemical reactions is likely to be expressed by the following formula.

$$2CH_3OH+2H_2O+\tfrac{3}{2}O_2 \rightarrow 2CO_2+3H_2O+3H_2$$

The theoretical efficiency of this reaction is 59% (calorific power of 3 mol hydrogen/calorific power of 2 mol methanol).

With regard to the hydrogen generating device "having a means for withdrawing electric energy to outside with the fuel electrode serving as a negative electrode and with the oxidizing electrode as a positive electrode" according to Claim 15 of the present invention (hereinafter referred to as "discharging condition"), hydrogen is likely to be generated depending on the mechanism similar to the hydrogen generation mechanism under the open-circuit condition. However, in contrast with the open-circuit condition, with this system, there is a need for $H^+$ corresponding to discharge current to migrate from the fuel electrode to the air electrode in order to establish the neutralized electrical condition of the cell. Therefore, it is likely that reaction of formula (A) rather than reaction of formula (C) will proceed faster (more) on the fuel electrode while reaction of formula (B) rather than reaction of formula (D) will proceed faster (more) on the air electrode.

With regard to the hydrogen generating device "having a means for providing electric energy from outside with the fuel electrode serving as cathode and the oxidizing electrode as anode" according to Claim 16 of the present invention (hereinafter referred to as "charging conditions"), hydrogen is likely to be generated depending on the mechanism similar to the hydrogen generation mechanism under the open-circuit condition. However, in contrast with the open-circuit condition, with this system, there is a need for $H^+$ corresponding to electrolysis current to migrate from the air electrode to the fuel electrode in order to establish the neutralized electrical condition of the cell. Therefore, it is likely that reaction of formula (C) rather than reaction of formula (A) will proceed faster (more) on the fuel electrode while reaction of formula (D) rather than reaction of formula (B) will proceed faster (more) on the air electrode.

In manufacturing the hydrogen generating device of the present invention, an MEA (membrane/electrode assembly) is fabricated first as in the case of the conventional direct methanol type fuel cell.

The method for fabricating an MEA as shown in FIGS. 4 to 8 is not limited to any specific one, but a method similar to a conventional one may be employed wherein a fuel electrode (12) including a fuel electrode catalyst layer and a gas diffusion layer, and an air electrode (14) including an air electrode catalyst layer and a gas diffusion layer, with a partition membrane (11) inserted therebetween are compressed at a high temperature to be assembled.

Figure 4:
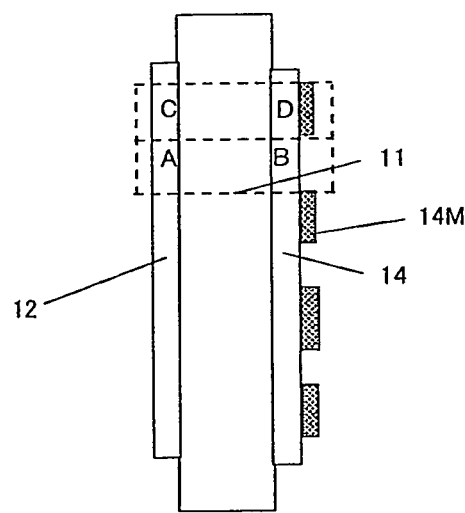
FIG. 4 is a schematic diagram for showing an example of an MEA in which masks are provided on part of the surface of the air electrode used in the hydrogen generating electrode of the present invention.

In order to provide a region of insufficient oxidizing agent (air) supply on the air electrode (14), masks (14M) are preferably provided (masking is preferably performed), as shown in FIG. 4, on part of the gas diffusion layer of the air electrode (gas diffusion layer of the MEA).

Figure 5:
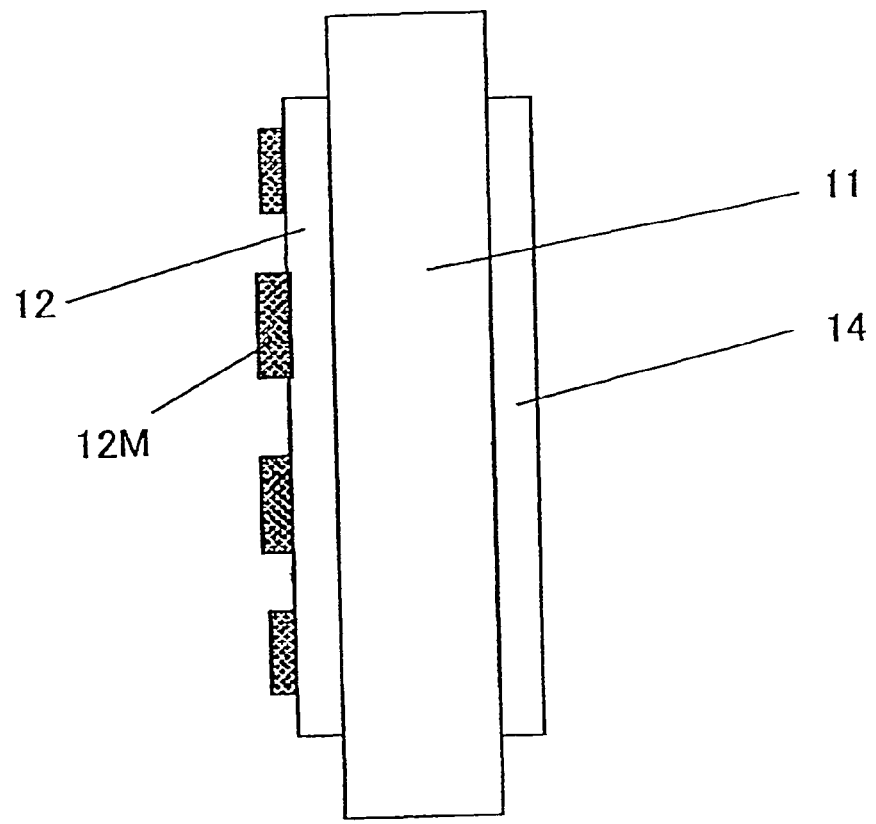
FIG. 5 is a schematic diagram for showing an example of an MEA in which masks are provided on part of the surface of the fuel electrode.

As shown in FIG. 5, even if masks (12M) are provided on part of the gas diffusion layer of the fuel electrode (12) (gas diffusion layer of the MEA), though the amount is minute, hydrogen is generated, as shown in Examples described later. This is caused by the fact that masking performed on part of the fuel electrode increases diffusion of methanol and water to the air electrode side via an electrolyte in the part where no masking is performed and decreases diffusion of methanol and water to the air electrode side in the part where masking is performed. As a result, a region of insufficient oxygen is formed on the air electrode side due to consumption of oxygen by oxidation of methanol in the air electrode side where methanol is diffused, whereas on the air electrode side where methanol is not diffused, a region of sufficient oxygen is formed on the air electrode side due to no consumption of oxygen, thereby considers to obtain the same effect as in the case of performing masking on part of the air electrode side.

If masks (12M) and (14M) are provided on parts of the gas diffusion layers of the fuel electrode (12) and the air electrode (14) respectively, as shown in Examples described later, there is a case that hydrogen is generated and a case that no hydrogen is generated.

Figure 6:
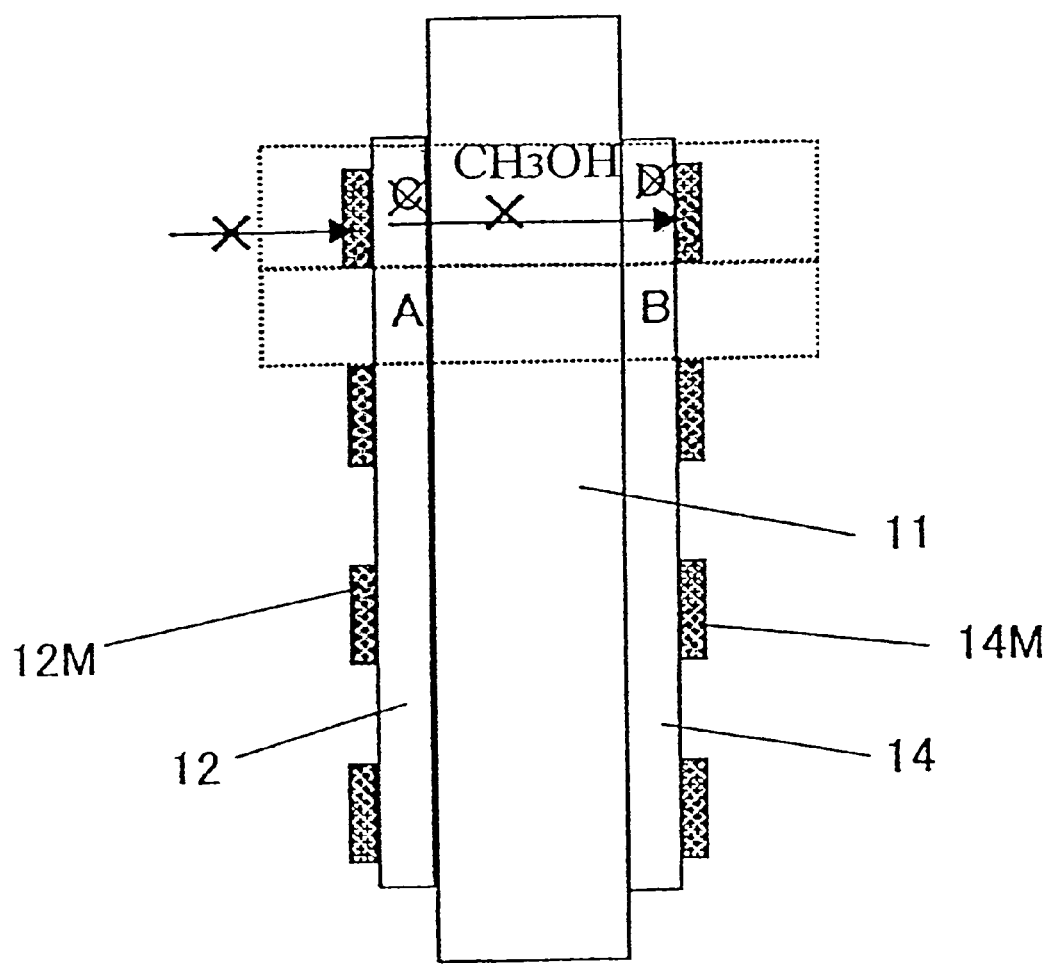
FIG. 6 is a schematic diagram for showing an example of an MEA in which masks are provided so as to be opposed to one another on parts of the surfaces of the fuel electrode and the air electrode.

As shown in FIG. 6, if masks are provided on parts of the gas diffusion layers of the fuel electrode (12) and the air electrode (14) so that they are opposed to one another in the same positions, hydrogen is not generated. This is probably because no methanol is diffused for the reaction (D) and thus the hydrogen generation reaction (C) does not occur, since masks (12M) are provided in regions of the corresponding fuel electrode (12) although a hydrogen generation region is formed by providing masks (14M) on part of the gas diffusion layer of the air electrode (14).

Figure 7:
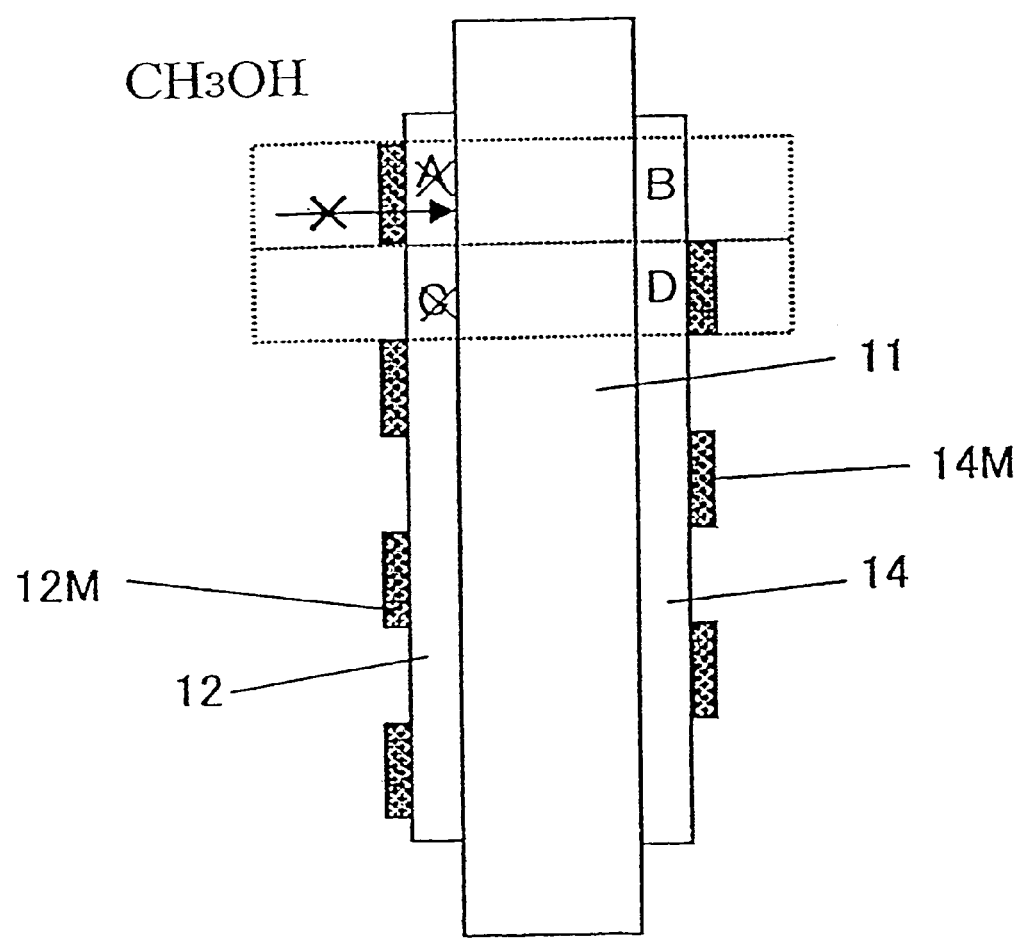
FIG. 7 is a schematic diagram for showing an example of an MEA in which masks are provided so as not to be opposed to one another on parts of the surfaces of the fuel electrode and the air electrode.

As shown in FIG. 7, if masks are provided on parts of the gas diffusion layers of the fuel electrode (12) and the air electrode (14) so that they are not opposed to one another in the opposite positions, hydrogen is not generated. This is probably because no $H^+$ and $e^-$ are supplied from the discharge region to the hydrogen generation region and thus the hydrogen generation reaction (C) does not occur, since masks (12M) are provided in the discharge region of the fuel electrode (12), methanol is not supplied, the reaction (A) does not occur, and no $H^+$ and $e^-$ are generated.

Figure 8:
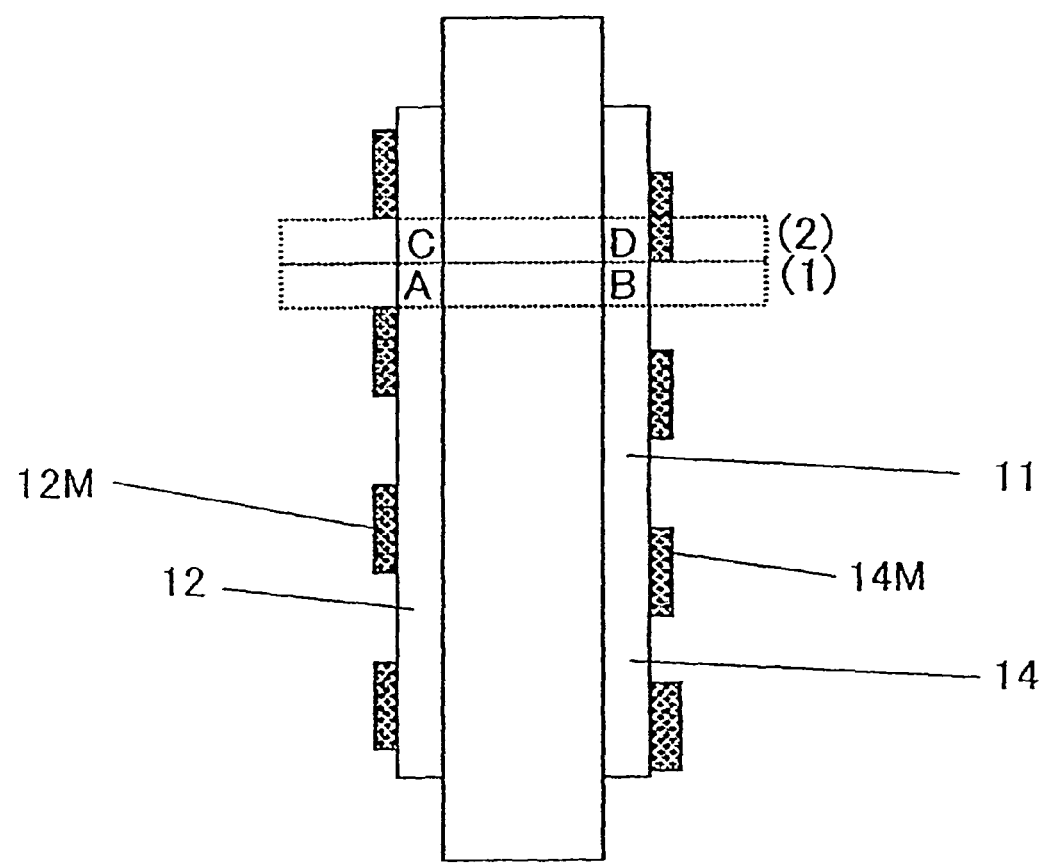
FIG. 8 is a schematic diagram for showing an example of an MEA in which masks are provided with being half displaced so that only part of the mask is opposed to one another on parts of the surfaces of the fuel electrode and the air electrode.

As shown in FIG. 8, if masks (12M) and (14M) are provided at a position displaced half on parts of the gas diffusion layers of the fuel electrode (12) and the air electrode (14) so that only parts of the masks (12M) and (14M) are opposed, a discharge region (1) and a hydrogen generation region (2) are formed, a discharge reaction occurs in the region (1) and a hydrogen generation reaction occurs in the region (2), thereby generating hydrogen.

Figure 9:
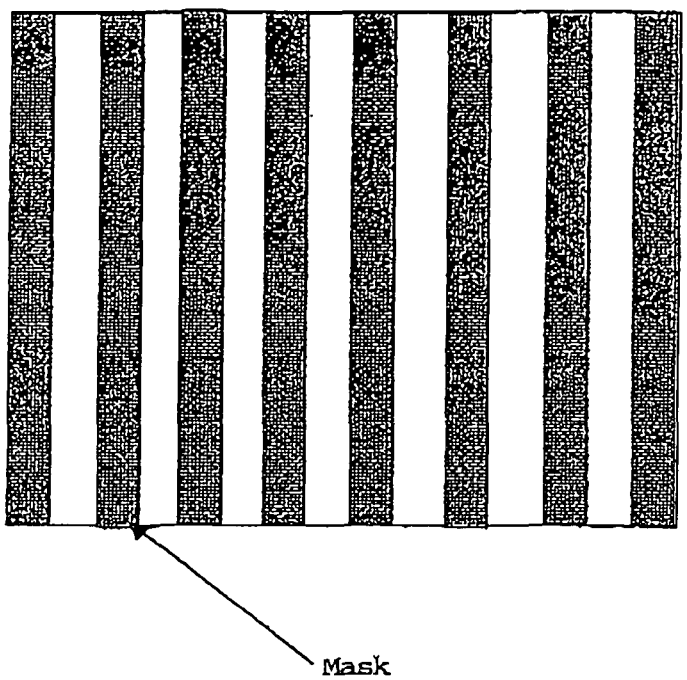
FIG. 9 is a schematic diagram for showing the width, distance and number of the masks provided on parts of the surfaces of the fuel electrode and the air electrode.

The shape of masking (mask) is not limited to any specific shape, however, as shown in FIG. 9, masking can be performed in the strip shape. Masking may be performed in the spot shape.

The width, distance and number of the strip-shaped masks or the size and number of the spot-shaped masks are appropriately set, thereby enabling the control of the evolution volume of a gas containing hydrogen.

A resin such as epoxy resin can be used as a material for the masking.

Moreover, as a means for masking, there can be employed impregnation of the gas diffusion layer, coating, screen printing, seal attachment to make masking simple.

Further, not only by the above masking, but also by a means for forming sparse and dense regions on the gas diffusion layer, for using different materials in combination to form the gas diffusion layer, for forming irregularities on the gas diffusion layer or the like, the gas diffusion layer on the oxidizing electrode is made inhomogeneous, thereby allowing a region of insufficient oxidizing agent supply to be provided on the oxidizing electrode side.

As a partition membranes (11) of the MEA in the hydrogen generating device of the present invention, a proton conducting solid electrolyte membrane which has been used as a polymer electrolyte membrane in a fuel cell can be used. The proton conducting solid electrolyte membrane preferably includes a membrane based on perfluorocarbon sulfonate having sulfonic acid group such as Nafion provided by Dupont.

The fuel electrode and the oxidizing electrode (air electrode) are preferably conductive and have a catalytic activity. Production of such an electrode may be achieved by providing a catalyst paste onto a gas diffusion layer and drying the paste, wherein the paste is comprised of a catalyst obtained by blending a precious metal with carbon powder serving as a base, a binding agent such as a PTFE resin, and an ion conductivity conferring substance such as Nafion solution.

The gas diffusion layer is preferably made of a carbon paper treated to be water-repellent.

The catalyst to be applied to the fuel electrode is not limited to any specific one, but is preferably a platinum-ruthenium alloy supported by carbon powder serving as a base.

The catalyst applied to the air electrode is not limited to any specific one, but is preferably platinum supported by carbon powder serving as a base.

For a hydrogen generating device configured as described above, when a fuel containing an organic compound such as an aqueous solution of methanol is supplied to the fuel electrode, and an oxidizing agent such as air, oxygen or hydrogen peroxide is supplied to the oxidizing electrode (air electrode), gas containing hydrogen is generated on the fuel electrode under specified conditions.

In the hydrogen generating device of the present invention, since the evolution volume of hydrogen-containing gas tends to depend on the voltage between the fuel electrode and the oxidizing electrode (air electrode), the evolution volume of hydrogen-containing gas can be adjusted by varying the voltage (open-circuit voltage or operation voltage) between the fuel electrode and the oxidizing electrode (air electrode) under any one of open-circuit condition, discharging conditions and charging conditions.

For the open circuit condition, since hydrogen is generated, as shown in Examples, when the open-circuit voltage is in the range of 400 to 600 mV, the evolution volume of hydrogen-containing gas can be adjusted by varying the open-circuit voltage within this range.

The open-circuit voltage or operation voltage and/or the evolution volume of hydrogen-containing gas evolution volume (evolution rate of hydrogen) can be adjusted by varying the supply volume of an oxidizing agent (air, oxygen or the like), or the concentration of an oxidizing agent, or the supply volume of organic compound-containing fuel, or the concentration of organic compound-containing fuel.

It is also possible to adjust the operation voltage and/or the evolution volume of hydrogen-containing gas by varying, for the discharging condition, electric energy withdrawn to outside, (varying current withdrawn to outside, or varying the voltage withdrawn to outside using a constant-voltage controllable power source, for example, so-called potentiostat), or by varying, for the charging condition, electric energy to be supplied (or by varying current to be supplied, or by varying the voltage to be supplied using a constant-voltage power source, for example, so-called potentiostat).

In the hydrogen generating device of the present invention, since it is possible to decompose organic compound-containing fuel at 100° C. or lower, the hydrogen generating device can be operated at an operation temperature of 100° C. or lower. The operation temperature is preferably 30 to 90° C. This is because, when the operation temperature is adjusted to be between 30 to 90° C., it will become possible to adjust the open-circuit voltage or operation voltage, and/or the evolution volume of hydrogen-containing gas as will be described later in relation to Example.

Incidentally, in a conventional reforming technology requiring an operation temperature of 100° C. or higher, water will become vapor and organic compound-containing fuel will become gas, and even when hydrogen is generated under this condition, it is necessary to provide means specifically adapted for separating hydrogen. The present invention is advantageous in this point.

Indeed, there will arise a problem as described above, when organic compound-containing fuel is decomposed at 100° C. or higher. But a hydrogen generating device of the invention may be operated at a temperature slightly above 100° C. if there be need to do so.

As long as based on the putative principle, the organic compound-containing fuel may be liquid or gaseous fuel capable of producing proton as a result of electrochemical oxidization passing through a proton conductive partition membrane, and liquid fuel containing alcohol such as methanol, ethanol, ethylene glycol, 2-propanol, aldehyde such as formaldehyde, carboxyl acid such as formic acid, or ether such as diethyl ether is preferred. Since the organic compound-containing fuel is supplied with water, a solution including alcohol and water, and particularly methanol and water is preferred. The aqueous solution of methanol cited above as a preferred example of fuel is a solution containing at least methanol and water, and its concentration of methanol at a region where hydrogen-containing gas is generated may be arbitrarily determined as needed.

Suitable oxidizing agents may include gaseous or liquid oxidizing agents. Suitable gaseous oxidizing agents may include oxygen-containing gas or oxygen. The concentration of oxygen in oxygen-containing gas is preferably chosen to be 10% or higher particularly. Suitable liquid oxidizing agents may include hydrogen peroxide-containing liquid.

In the present invention, since fuel charged into the hydrogen generating device is consumed at once in the device and the fraction of the fuel converted into hydrogen is rather small, it is desirable to provide a fuel circulating means to thereby improve the fraction of fuel to be converted into hydrogen.

The hydrogen generating device of the present invention has a means for collecting hydrogen-containing gas gas from the fuel electrode side. The means is preferably so constructed as to be able to collect carbon dioxide as well as hydrogen. Since the device operates at a temperature as low as 100° C. or lower, it is possible to attach a carbon dioxide absorbing portion for absorbing carbon dioxide contained in hydrogen-containing gas to the system by a simple means.

Next, an example of a package-type fuel cell power generating device which is an embodiment of the fuel cell power generating device using the hydrogen generating device of the present invention. The package-type fuel cell power generating device supplies gas containing the hydrogen generated by the hydrogen generating device to the fuel cell by connecting to the above hydrogen generating device with the fuel cell.

Figure 10:
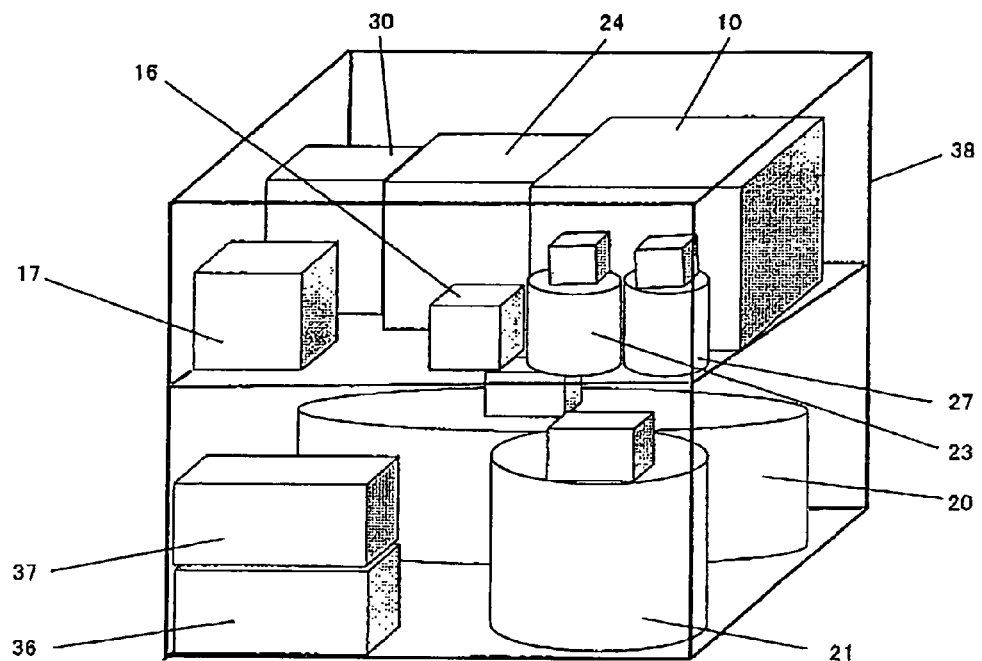
FIG. 10 is a schematic diagram for showing an example of a configuration of a fuel cell power generating device of the present invention.

The basic structure of the fuel cell power generating device of the present invention is that, as shown in FIG. 10, at least a fuel cell (30) for power generation by supplying hydrogen and an oxidizing agent, a hydrogen generating cell (10) for generating a hydrogen-containing gas to be supplied to the fuel cell (30), a power converting device (36) for converting a direct-current power generated by the fuel cell (30) to a predetermined power, a control device (37) for control of an entire power generating device, and auxiliary machines such as a fuel pump (16), an air blower (17) and the like are incorporated in a package (38).

In the fuel cell power generating device of the present invention, since the hydrogen generating cell (10) constituting the hydrogen generating device is driven at a low temperature, unlike the conventional fuel reforming device, it is possible to arrange the control device (37) close to the hydrogen generating cell (10). Also, an insulating material for protecting the control device (37) from a heat generated by the hydrogen generating cell (10) can be eliminated.

In this figure, the fuel tank (20) and the fuel control vessel (21) are incorporated in the package, but it may be so constructed that fuel (aqueous solution of methanol) is supplied from outside of the package without incorporating them or only the fuel control vessel (21) is incorporated in the package.

Also, the hydrogen-containing gas generated from the hydrogen generating cell (10) may be directly supplied to the fuel cell (30), but it is preferable that the hydrogen tank (24) for storing the hydrogen-containing gas is provided for supplying it from the hydrogen tank (24) to the fuel cell (30).

Moreover, it is preferable that a gas/liquid separator (23) for separating a hydrogen-containing gas from an unreacted aqueous solution of methanol is provided, and unreacted aqueous solution of methanol is circulated in the hydrogen generating cell (10). Besides them, a gas/liquid separator (27) for separating generated water and the aqueous solution of unreacted methanol from exhaust air may be provided.

Though not shown, a backup battery may be provided in addition to them.

Figure 11:
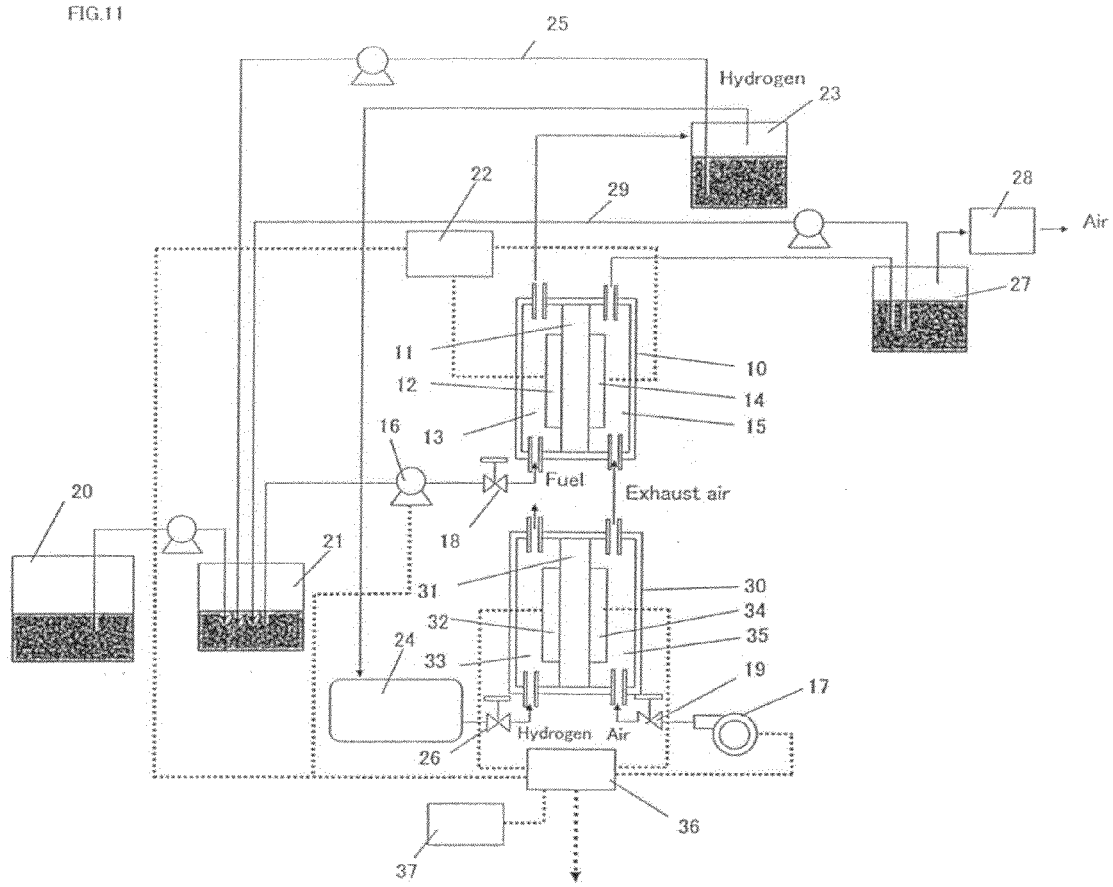
FIG. 11 is a schematic diagram for showing a relation between the hydrogen generating device and the fuel cell in the fuel cell power generating device of the present invention.

The hydrogen generating device used in the fuel cell power generating device of the present invention has, as shown in FIG. 11, auxiliary machines for driving the hydrogen generating cell (10) and the hydrogen generating device.

The structure of the hydrogen generating cell (10) is such that a fuel electrode (12) is provided on one surface of a partition membrane (11), a feed channel (13) for supplying fuel containing an organic compound (aqueous solution of methanol) and water is provided at the fuel electrode (12), an oxidizing electrode (14) is provided on the other surface of the partition membrane (11) and a feed channel (15) is provided for supplying an oxidizing agent (air) to the oxidizing electrode (14).

As the auxiliary machine for driving the hydrogen generating device, a fuel pump (16) for supplying an aqueous solution of methanol to the fuel electrode (12) is provided. The feed channel (13) at the fuel electrode is connected to the fuel pump (16) via a flow control valve (18) with a guide tube.

The fuel (100% methanol) is stored in the fuel tank (20) and moved to the fuel control vessel (21) from there, mixed with water in the fuel control vessel (21) and controlled to about a 3% aqueous solution of methanol, for example, and supplied to the fuel electrode (12).

Also, as the auxiliary machine, an air blower (17) may be provided for supplying air to the oxidizing electrode (14) directly. In this figure, air is supplied by the air blower (17) to the fuel cell (30) and unreacted air (exhaust air) exhausted from the fuel cell (30) is used.

When not air, but oxygen from an oxidizing agent storage device is supplied to the fuel cell (30), unreacted oxygen (oxygen off-gas) exhausted from the fuel cell (30) is used.

Here, by feeding the exhaust air or oxygen off-gas exhausted from an air electrode of the fuel cell (30) to the hydrogen generating cell (10), an air blower for the hydrogen generating cell (10) is not needed any more. The feed channel (15) at the oxidizing electrode (14) of the hydrogen generating cell (10) is connected to the air blower (17) through a feed channel (35) at the air electrode (34) of the fuel cell (30).

Moreover, this exhaust air or oxygen off-gas has substantially the same temperature (about 80° C.) with the operation temperature of the fuel cell (30). Thus, the heat of the exhaust air or oxygen off-gas can be used as a heat source for heating the hydrogen generating cell (10).

Furthermore, if two or more hydrogen generating devices are used in combination, as air to be supplied to the oxidizing electrode (14) of one of the hydrogen generating cell (10), the exhaust air exhausted from the other hydrogen generating cell (10) can be used.

The electric energy supplied to the fuel pump (16) and the air blower (17) as the auxiliary machine for driving the hydrogen generating device is obtained from the fuel cell, thereby constructing a stand-alone hydrogen generating system.

As a fuel cell, by using the fuel cell (30), part of the electric energy obtained from the fuel cell (30) can be resupplied to the auxiliary machines for operating the hydrogen generating device, and another direct methanol type fuel cell for supplying electric energy obtained from the fuel cell may be provided.

In the hydrogen generating device in the above construction, when electric energy is supplied to the fuel pump (16) and the air blower (17) to operate them, and the flow control valve (18) is opened, the aqueous solution of methanol is supplied by the fuel pump (16) from the fuel control vessel (21) via the feed channel (13) to the fuel electrode (12), and when the flow control valve (19) is opened, air is supplied to the oxidizing electrode (14) by the air blower (17) via the fuel cell (30) and the feed channel (15).

By this, reaction which will be described later occurs between the fuel electrode and the oxidizing electrode (air electrode) and a hydrogen-containing gas is generated from the fuel electrode (12).

Moreover, the evolution volume of the hydrogen-containing gas can be adjusted by providing a voltage controller (22) for monitoring a voltage (open circuit voltage or operation voltage) of the hydrogen generating cell (10) so as to control a supply volume or concentration of fuel and air and electric energy to be withdrawn or electric energy to be provided.

The generated hydrogen-containing gas is passed through a gas/liquid separator (23) and separated the hydrogen-containing gas from the unreacted aqueous solution of methanol, and the hydrogen-containing gas is stored in the hydrogen tank (24).

A part or the whole of the separated unreacted aqueous solution of methanol is returned to the fuel control vessel (21) by a guide tube (25) for circulation. Water may be supplied from outside of the system depending on the case.

Since the exhaust air exhausted from the hydrogen generating device contains unreacted aqueous solution of methanol permeated from the fuel electrode by crossover phenomenon with generated water, this exhaust air is passed through a gas/liquid separator (27) to separate the generated water and the unreacted aqueous solution of methanol from the air, and is eliminated carbon dioxide by a carbon dioxide removing device (28) and then, the rest is exhausted to the air.

A part or the whole of the separated generated water and unreacted aqueous solution of methanol is returned to the fuel control vessel (21) by the guide tube (29) for circulation.

To the hydrogen electrode (32) of the fuel cell (30), hydrogen stored in the hydrogen tank (24) is supplied through the flow control valve (26), while to the air electrode (34), air from the air blower (17) is supplied through the flow control valve (19), and a reaction of a formula [1] occurs at the hydrogen electrode and a reaction of a formula [2] occurs at the air electrode. At the entire fuel cell, a reaction of a formula [3] occurs and water (steam) is generated and electricity (direct-current power) is generated.

$$H_2 \rightarrow 2H^+ + 2e^- \quad [1]$$

$$2H^+ + 2e + (1/2)O_2 \rightarrow H_2O \quad [2]$$

$$H_2 + (1/2)O_2 \rightarrow H_2O \quad [3]$$

As the fuel cell (30), if the fuel is hydrogen, any hydrogen may be used, but a polymer electrolyte fuel cell (PEFC) which can be driven at a low temperature below 100° C. is preferable. As the polymer electrolyte fuel cell, a fuel cell stack in which a plurality of known single cells are laminated may be employed. One single cell comprises a solid polymer electrolyte membrane (31) such as Nafion (trademark of Dupont), the hydrogen electrode (32) and the air electrode (34), which are diffusion electrodes holding it from both sides, and two separators and the like further holding them from both sides. On the both surfaces of the separator, projections and recessed are formed, so as to form gas feed channels in single cell (33), (35) between the hydrogen electrode and the air electrode. Among them, the supplied hydrogen gas flows through the gas feed channel in the single cell (33) formed with the hydrogen electrode, while air flows through the gas feed channel in the single cell (35) formed with the air electrode, respectively.

Power generation by the fuel cell (30) involves heat generation. In the case of the above polymer electrolyte fuel cell (PEFC), since the solid polymer electrolyte membrane indicates proton conductivity in the water contained state, when the polymer electrolyte membrane is dried with heat generation of the fuel cell and the water content is lowered, an internal resistance of the fuel cell is increased and power generating capacity is lowered. Therefore, it is necessary to cool the fuel cell and to maintain an appropriate operation temperature (about 80° C.) to avoid drying of the polymer electrolyte membrane. On the other hand, since the hydrogen generating device has a higher hydrogen generating efficiency when the temperature is higher, as is shown in Examples which will be described later, it is preferable that heat generation of this fuel cell is used for heating of the hydrogen generating device by providing a heat exchange means.

Conventionally, in order to maintain the polymer electrolyte membrane in wet state, a reform gas and/or reaction air was supplied to the fuel cell after being humidified. However, since the hydrogen generating device used in the present invention withdraws the hydrogen-containing gas from the fuel electrode supplying the fuel containing the organic compound and water (aqueous solution of methanol and the like) and hydrogen is humidified, a humidifier is not needed any more. Moreover, since the hydrogen-containing gas generated from the hydrogen generating cell (10) is not so hot as the reform gas generated by the conventional reforming device, it can be supplied to the fuel cell (30) without being cooled.

Also, as the fuel to be supplied to the fuel cell, there can be a case where only hydrogen generated from the hydrogen generating cell (10) is supplied and a case where an aqueous solution of methanol containing hydrogen is supplied. In the case of supply of the aqueous solution of methanol containing hydrogen, the gas/liquid separator (23) is not needed.

The direct-current power generated by the fuel cell (30) is introduced into the power converting device (36), its voltage is raised by a DC/DC converter or converted to an alternating current by a DC/AC inverter and outputted. Also, the direct-current power stabilized by the converter for auxiliary machines is used as a driving power source for the auxiliary machines such as the fuel pump (16), the air blower (17) and the like, and the alternating-current power is used as the driving power source for the electric equipment at home.

In a series of these power generating operations, the control device (37) controls operations of the auxiliary machines such as the voltage controller (22) of the hydrogen generating cell (10), the fuel cell (30), the power converting device (36), the fuel pump (16), the air blower (17) and the like.

The fuel cell generating device as described above can be incorporated in an electric automobile and a submergible ship.

The electric automobile of the present invention is basically composed of a fuel cell for generating electric power by supplying hydrogen and an oxidizing agent, a hydrogen generating device for generating a hydrogen-containing gas to be supplied to the fuel cell, and a motor driven by electricity generated by the fuel cell.

Figure 12:
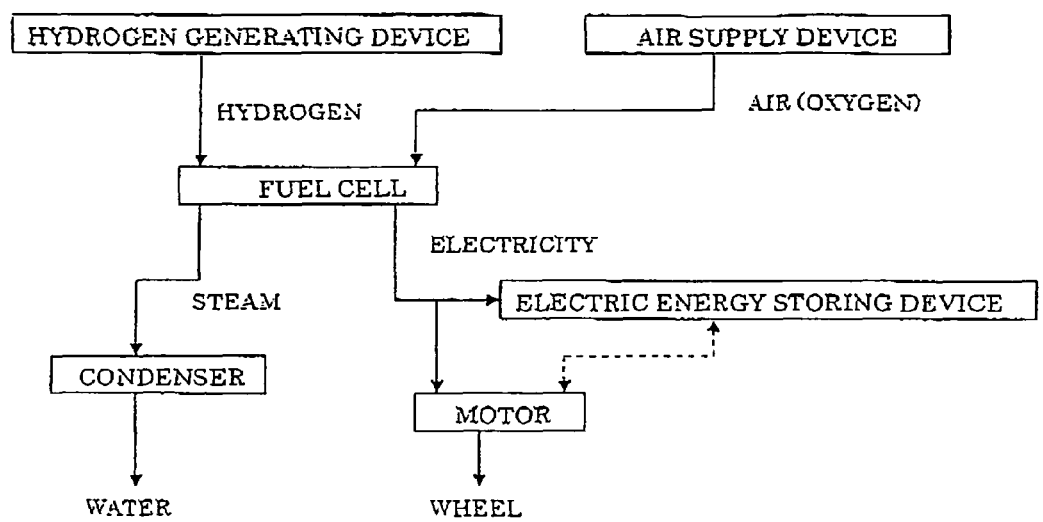
FIG. 12 is a diagram for showing a system flow of a fuel cell system in the electric automobile of the present invention.

FIG. 12 shows an example of a system flow of a fuel cell system in the electric automobile of the present invention.

The submergible ship of the present invention is basically composed of a fuel cell for generating electric power by supplying hydrogen and an oxidizing agent, a hydrogen generating device for generating a hydrogen-containing gas to be supplied to the fuel cell, and a propulsion device driven by electricity generated by the fuel cell.

Figure 13:
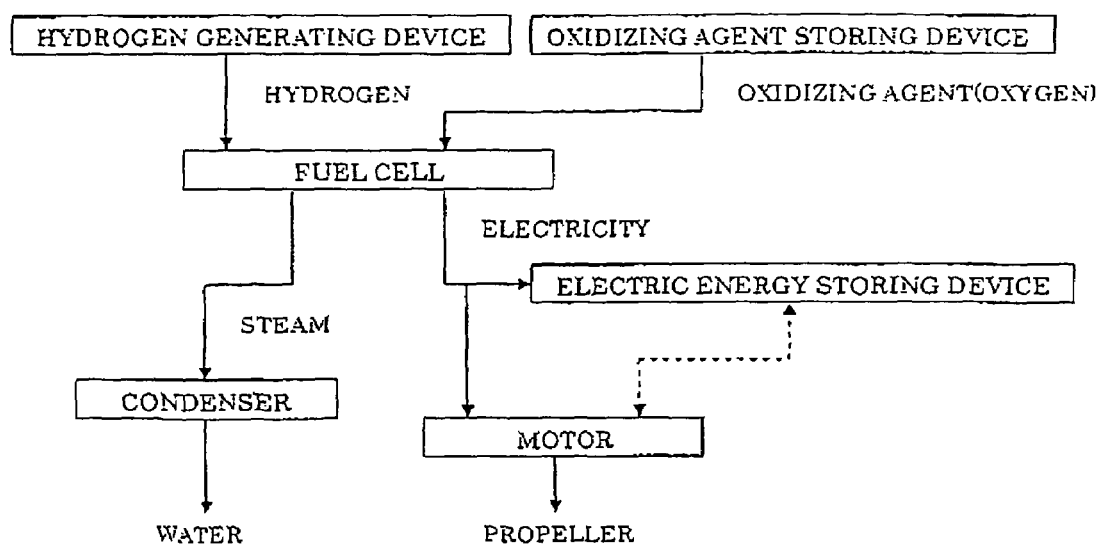
FIG. 13 is a diagram for showing a system flow of the fuel cell system in a submergible ship of the present invention.

FIG. 13 shows an example of a system flow of a fuel cell system in the submergible ship of the present invention.

In the fuel cell power generating device shown in FIG. 10 to be incorporated in the electric automobile or submergible ship of the present invention, since the hydrogen generating cell (10) constituting the hydrogen generating device is driven at a low temperature, unlike the conventional fuel reforming device, it is possible to arrange the control device (37) close to the hydrogen generating cell (10). Also, an insulating material for protecting the control device (37) from a heat generated by the hydrogen generating cell (10) can be eliminated.

In this figure, the fuel tank (20) and the fuel control vessel (21) are incorporated in the electric automobile or submergible ship, but, the fuel (aqueous solution of methanol) may be supplied from outside without incorporating them or only the fuel control vessel (21) may be incorporated in the electric automobile or submergible ship.

In the case of electric automobile, the direct-current power generated by the fuel cell is converted to an alternating-current power by a DC/AC inverter as described above, and is supplied to the motor which is a power source of the electric automobile, thereby driving the motor and transmitting its generated torque to an axle by gears to drive wheels and run the automobile.

In the case of submergible ship, for example, a known means comprising a motor and a propulsion propeller mounted on the rotational shaft of the motor can be employed as a propulsion device. The direct-current power generated by the fuel cell is converted to an alternating-current power by the DC/AC inverter as described above, and is supplied to the motor which is a power source of the submergible ship, thereby driving the motor to rotate the propulsion propeller mounted on the rotational shaft of the motor.

Incidentally, the electricity generated by the fuel cell is also supplied to an ahead-look sonar, an underwater projector, observation equipments and the like.

Both for the electric automobile and the submergible ship, it is preferable that an electric energy storage device in order to store electricity generated by the fuel cell is provided. The electricity generated by the fuel cell is supplied to the motor and the electric energy storage device by using a control device depending on the load of the motor and the electric-storage amount of the electric energy storage device. Specifically, at the time of acceleration, for example, if the load of the motor is large, the electricity from the fuel cell and the electric energy storage device is supplied to the motor. On the other hand, at the time of deceleration, in braking or the like, regenerative electric power obtained from the motor is supplied to the electric energy storage device. As the electric energy storage device, for example, a secondary cell, an electric double-layer capacitor or the like can be used.

A hydrogen supply system may be configured by connecting the hydrogen generating device of the present invention with a hydrogen storage means and supplying a gas containing hydrogen to the hydrogen storage means generated by the hydrogen generating device.

In the case where the hydrogen storage means is a hydrogen storage container incorporated in the electric automobile (fuel cell automobile), the hydrogen supply system of the present invention is basically composed of a hydrogen supply means for supplying hydrogen to the hydrogen storage container and a hydrogen generating device for generating a gas containing hydrogen to be supplied to the hydrogen supply means.

Figure 14:
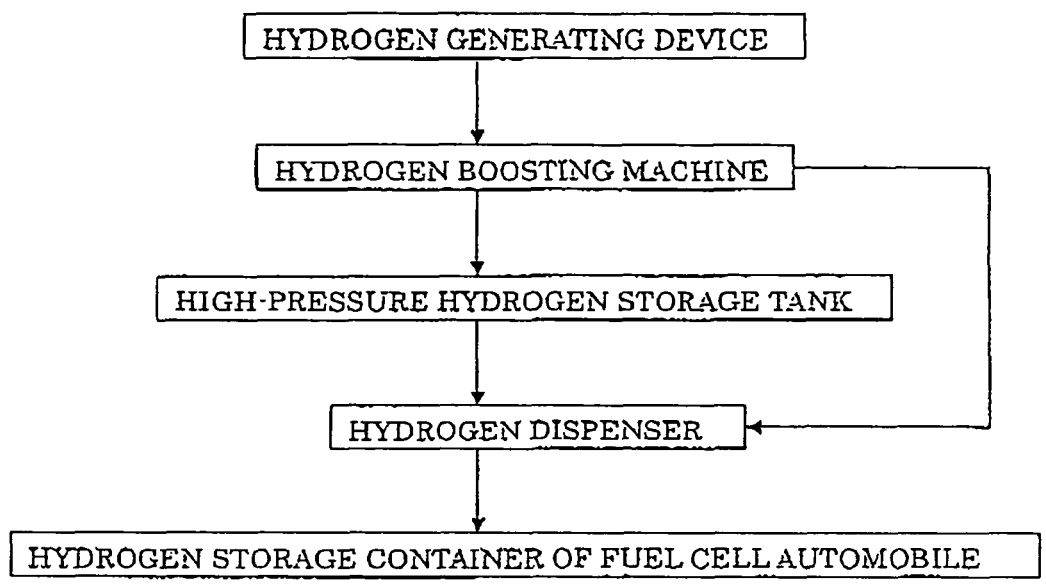
FIG. 14 is a diagram for showing a system flow of the hydrogen supply system of the present invention.

FIG. 14 shows an example of a system flow of the hydrogen supply system of the present invention.

The hydrogen supply means for supplying hydrogen to the hydrogen storage container incorporated in the fuel cell automobile comprises, for example, a hydrogen booster, a high-pressure hydrogen storage tank and a hydrogen dispenser.

As the hydrogen booster, a hydrogen compression pump is generally used, however, any device can be used as long as the pressure of hydrogen can be raised. The hydrogen gas pressure at the outlet of the hydrogen booster is preferably high in terms of a volumetric efficiency. The pressure is preferably 50 atm (5 MPa) or more, more preferably 100 atm (10 MPa) or more, and further preferably 200 atm (20 MPa) or more. The upper limit of the hydrogen gas pressure thereat is not specifically limited, however, it is preferably 1000 atm (100 MPa) or lower from a practical viewpoint.

A hydrogen storage tank (high-pressure hydrogen storage tank) for storing hydrogen is preferably provided after a hydrogen booster process. Configuration of the high-pressure hydrogen storage tank is not particularly limited as long as it can withstand the booster hydrogen, and any known tank can be applied. In addition to a high-pressure hydrogen storage tank for directly storing high-pressure hydrogen gas, a high-pressure hydrogen storage tank incorporating a hydrogen storage alloy may also be used.

Hydrogen gas is guided from the high-pressure hydrogen storage tank to the hydrogen dispenser. Moreover, the gas at the outlet of the hydrogen booster can be directly guided to the hydrogen dispenser without using a high-pressure hydrogen storage tank. In this case, a pipe arrangement connecting the hydrogen booster and the hydrogen dispenser to each other is provided.

The hydrogen dispenser supplies hydrogen gas to the hydrogen storage container of a fuel cell automobile using hydrogen as a fuel and can be a known dispenser. This hydrogen storage container may be a hydrogen storage container incorporated in the fuel cell automobile. When this container can be removed from the fuel cell automobile, it may be a hydrogen storage container removed from the fuel cell automobile.

Now, Examples of the present invention (examples of hydrogen generation) will be described below. However, the fractions of catalysts, PTFE, Nafion, etc., and the thickness of catalyst layer, gas diffusion layer and electrolyte membrane can be appropriately varied and are not limited by the Examples.

Example 1

Now, an example of generating hydrogen by the hydrogen generating device (under open-circuit condition) according to Claim 14 of the present invention will be described below.

A hydrogen generating cell was fabricated as follows:

With use of a proton conducting electrolyte membrane provided by Dupont (Nafion 115) as an electrolyte; and the air electrode is obtained by immersing carbon paper (Toray) in a solution where polytetrafluoroethylene is dispersed at 5%, and baking the paper at 360° c. to make it water-repellent, and coating, on one surface of the paper, air electrode catalyst paste comprised of air electrode catalyst (carbon-supported platinum, Tanaka Precious Metal), fine powder of PTFE, and 5% Nafion solution (Aldrich). Thus, the air electrode exists as a gas diffusion layer with air electrode catalyst. Here, the percent contents by weight of air electrode catalyst, PTFE, and Nafion were made 65%, 15% and 20%, respectively. The loading level of catalyst of the air electrode prepared as above was 1 mg/cm² in terms of the weight of platinum per unit area.

Another carbon paper was similarly treated to be made water-repellent. One surface of the paper was coated with fuel electrode catalyst paste comprised of fuel electrode catalyst (carbon-supported platinum-ruthenium, Tanaka Precious Metal), fine powder of PTFE, and 5% Nafion solution. Thus, the fuel electrode exists as a gas diffusion layer with fuel electrode catalyst. Here, the percent contents by weight of fuel electrode catalyst, PTFE, and Nafion were made 55%, 15% and 30%, respectively. The loading level of catalyst of the fuel electrode prepared as above was 1 mg/cm² in terms of the weight of platinum-ruthenium per unit area.

The electrolyte membrane, gas diffusion layer with air electrode catalyst and gas diffusion layer with fuel electrode catalyst were laid one over another to be hot-pressed at 140° C. under a pressure of 100 MPa so that they were assembled to form an MEA. The MEA prepared as above had an active electrode area of 60.8 cm² (80 mm long and 76 mm wide). The thicknesses of air and fuel electrode catalyst layers were practically the same about 30 μm, and the thicknesses of air and fuel electrode gas diffusion layers were similarly the same about 170 μm.

Figure 15:
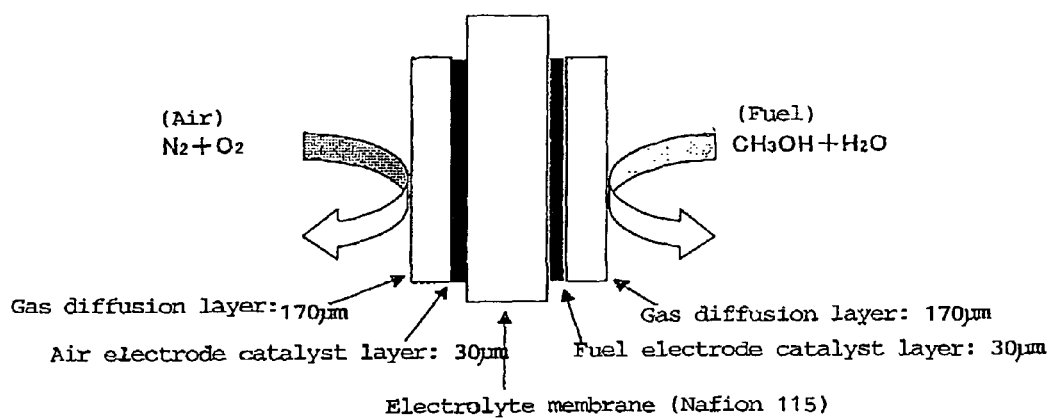
FIG. 15 is a schematic diagram for showing an MEA used in a hydrogen generating cell of Examples of the present invention.

The fabricated MEA is outlined in FIG. 15.

Epoxy resin was coated only on the gas diffusion layer of the air electrode of the MEA fabricated as described above to provide eight strip-shaped masks of 5 mm wide in a distance of 5 mm, as shown in FIGS. 4 and 9. On the air electrode side of the MEA fabricated as described above there was arranged via silicon rubber an air electrode side end plate provided with an air inlet and an air outlet, and on the fuel electrode side of the MEA fabricated as described above there was arranged via silicon rubber a fuel electrode side end plate provided with a fuel inlet and a fuel outlet, and laminated and held. Thereby, a space was provided so that fuel may be supplied to the surface of the fuel electrode and air may be supplied to the surface of the air electrode. Further, in order to prevent fuel and air from leaking, silicon rubber packings were provided around the fuel electrode and the air electrode. Moreover, in order to measure the potentials of the respective electrodes, stainless steel foils coming into contact with the electrodes were inserted between the packings and the MEA.

The hydrogen generating cell fabricated as described above was placed in a circulating hot air electric furnace. The temperature (operation temperature) of the cell was kept at 50° C., air was flowed at a flow rate of 10 to 50 ml/min to the air electrode, and 1M aqueous solution of methanol (fuel) was flowed at a flow rate of 5.0 ml/min to the fuel electrode. Then, the voltage difference between the fuel electrode and the air electrode (open voltage) and the evolution volume of the gas generated on the fuel electrode side were measured.

The evolution volume of gas was measured by underwater conversion. The concentration of hydrogen in the generated gas was analyzed by gas chromatography, and the rate of hydrogen evolution was determined.

The result is shown in Table 1:

TABLE 1

| Air flow rate/ml/min | Open-circuit voltage/mV | Gas evolution rate/ml/min | Hydrogen concentration/% | Hydrogen evolution rate/ml/min |
|---|---|---|---|---|
| 10 | 398 | 0 | 0.0 | 0.000 |
| 20 | 445 | 0.1 | 55.3 | 0.055 |
| 30 | 484 | 0.16 | 55.9 | 0.089 |

TABLE 1-continued

| Air flow rate/ml/min | Open-circuit voltage/mV | Gas evolution rate/ml/min | Hydrogen concentration/% | Hydrogen evolution rate/ml/min |
|---|---|---|---|---|
| 40 | 520 | 0.12 | 57.2 | 0.069 |
| 50 | 617 | 0 | 0.0 | 0.000 |

As shown in Table 1, generation of hydrogen was confirmed on the fuel electrode side of the cell with reduction of the flow rate of air. Moreover, studies of relation of flow rate of air with the open-circuit voltage (OCV) indicated that as the flow rate of air becomes low, the open-circuit voltage of the cell tends to decline.

It was found that the rate of hydrogen evolution (evolution volume of hydrogen) tends to depend on the open-circuit voltage, and that hydrogen is generated at an open-circuit voltage of 400 to 600 mV. Moreover, the peak of the rate of hydrogen evolution was observed at around 500 mV.

Example 2

A hydrogen generating cell was fabricated in the same way as in Example 1 except that epoxy resin was coated only on the gas diffusion layer of the fuel electrode of the MEA to provide eight strip-shaped masks of 5 mm wide in a distance of 5 mm, as shown in FIGS. 5 and 9. The evolution volume of gas generated on the fuel electrode was measured in the same way as in Example 1.

The result is shown in Table 2:

TABLE 2

| Air flow rate/ml/min | Open-circuit voltage/mV | Gas evolution rate/ml/min | Hydrogen concentration/% | Hydrogen evolution rate/ml/min |
|---|---|---|---|---|
| 10 | 318 | 0 | 0.0 | 0.00 |
| 20 | 466 | 0.1 | 9.8 | 0.01 |
| 30 | 500 | 0.12 | 10.0 | 0.01 |
| 40 | 538 | trace | 0.0 | 0.00 |
| 50 | 670 | 0 | 0.0 | 0.00 |

As shown in Table 2, generation of hydrogen was confirmed on the fuel electrode side of the cell at an open-circuit voltage of around 500 mV with reduction of the flow rate of air.

Comparative Example 1

A hydrogen generating cell was fabricated in the same way as in Example 1 except that epoxy resin was coated on the gas diffusion layers of the fuel electrode and the air electrode of the MEA to provide eight strip-shaped masks of 5 mm wide in a distance of 5 mm so as to be opposed to each other at the same positions, as shown in FIGS. 6 and 9. The evolution volume of the gas generated on the fuel electrode side was measured in the same way as in Example 1.

The result is shown in Table 3:

TABLE 3

| Air flow rate/ml/min | Open-circuit voltage/mv | Gas evolution rate/ml/min | Hydrogen concentration/% | Hydrogen evolution rate/ml/min |
|---|---|---|---|---|
| 10 | 404 | 0 | 0.0 | 0.00 |
| 20 | 496 | trace | 0.0 | 0.00 |
| 30 | 515 | trace | 0.0 | 0.00 |

TABLE 3-continued

| Air flow rate/ml/min | Open-circuit voltage/mv | Gas evolution rate/ml/min | Hydrogen concentration/% | Hydrogen evolution rate/ml/min |
|---|---|---|---|---|
| 40 | 544 | trace | 0.0 | 0.00 |
| 50 | 582 | 0 | 0.0 | 0.00 |

As shown in Table 3, generation of hydrogen was not confirmed on the fuel electrode side of the cell even with reduction of the flow rate of air.

This is because, as described above, since the hydrogen generation region of the fuel electrode is masked, methanol diffusion for a hydrogen generation reaction cannot be performed.

Comparative Example 2

A hydrogen generating cell was fabricated in the same way as in Example 1 except that epoxy resin was coated on the gas diffusion layers of the fuel electrode and the air electrode of the MEA to provide eight strip-shaped masks on the fuel electrode and six strip-shaped masks on the air electrode, of 5 mm wide in a distance of 5 mm so as not to be opposed to each other at the opposite positions, as shown in FIGS. 7 and 9. The evolution volume of the gas generated on the fuel electrode side was measured in the same way as in Example 1.

The result is shown in Table 4:

TABLE 4

| Air flow Rate/ml/min | Open-circuit voltage/mV | Gas evolution rate/ml/min | Hydrogen concentration/% | Hydrogen evolution rate/ml/min |
|---|---|---|---|---|
| 10 | 354 | 0 | 0.0 | 0.00 |
| 20 | 441 | trace | 0.0 | 0.00 |
| 30 | 477 | trace | 0.0 | 0.00 |
| 40 | 570 | trace | 0.0 | 0.00 |
| 50 | 682 | 0 | 0.0 | 0.00 |

As shown in Table 4, generation of hydrogen was not confirmed on the fuel electrode side of the cell even with reduction of the flow rate of air.

This is because, as described above, since the region where the discharge reaction occur of the fuel electrode is masked, methanol supply for a discharge reaction cannot be performed.

Example 3

Using an MEA fabricated from another lot, a hydrogen generating cell was fabricated in the same way as in Example 1, and the evolution volume of the gas generated on the fuel electrode side was measured in the same way as in Example 1.

The result is shown in Table 5:

TABLE 5

| Air flow rate/ml/min | Open-circuit voltage/mV | Gas evolution rate/ml/min | Hydrogen concentration/% | Hydrogen evolution rate/ml/min |
|---|---|---|---|---|
| 10 | 324 | 0 | 0.0 | 0.00 |
| 20 | 378 | 0 | 0.0 | 0.00 |
| 30 | 392 | 0 | 0.0 | 0.00 |
| 40 | 431 | 0.16 | 65.7 | 0.11 |
| 50 | 474 | 0.24 | 68.6 | 0.16 |

TABLE 5-continued

| Air flow rate/ml/min | Open-circuit voltage/mV | Gas evolution rate/ml/min | Hydrogen concentration/% | Hydrogen evolution rate/ml/min |
|---|---|---|---|---|
| 60 | 545 | 0.1 | 66.7 | 0.07 |
| 70 | 664 | 0 | 0.0 | 0.00 |

As shown in Table 5, generation of hydrogen was confirmed on the fuel electrode side of the cell with a slightly higher air flow rate than in Example 1. Moreover, according to studies of relation of flow rate of air with the open-circuit voltage (OCV), it is confirmed that as the flow rate of air becomes low, the open-circuit voltage of the cell tends to decline.

It was found that the rate of hydrogen evolution (evolution volume of hydrogen) tends to depend on the open-circuit voltage, and that hydrogen is generated at an open-circuit voltage of 400 to 600 mV. Moreover, the peak of the rate of hydrogen evolution was observed at around 470 mV.

Example 4

A hydrogen generating cell was fabricated in the same way as in Example 1 except that epoxy resin was coated on the gas diffusion layers of the fuel electrode and the air electrode of the MEA to provide half displaced eight strip-shaped masks of 5 mm wide in a distance of 5 mm so that only part of the masks are opposed to each other, as shown in FIGS. 8 and 9. The evolution volume of the gas generated on the fuel electrode side was measured in the same way as in Example 1.

The result is shown in Table 6:

TABLE 6

| Air flow rate/ml/min | Open-circuit voltage/mV | Gas evolution rate/ml/min | Hydrogen concentration/% | Hydrogen evolution rate/ml/min |
|---|---|---|---|---|
| 10 | 393 | 0 | 0.0 | 0.00 |
| 20 | 463 | trace | 0.0 | 0.00 |
| 30 | 483 | 0.05 | 64.4 | 0.03 |
| 40 | 498 | 0.05 | 59.2 | 0.03 |
| 50 | 592 | 0 | 0.0 | 0.00 |

As shown in Table 6, generation of hydrogen was confirmed on the fuel electrode side of the cell at an open-circuit voltage of around 500 mV with reduction of the flow rate of air.

When the masks are displaced, as described above, a discharge region and a hydrogen generation region are formed, and hydrogen is generated.

Example 5

Now, there will be described an example of forming a region of insufficient air supply on the air electrode side by using different materials in combination to make the gas diffusion layer of the air electrode inhomogeneous instead of performing masking on part of the gas diffusion layer.

Figure 16:
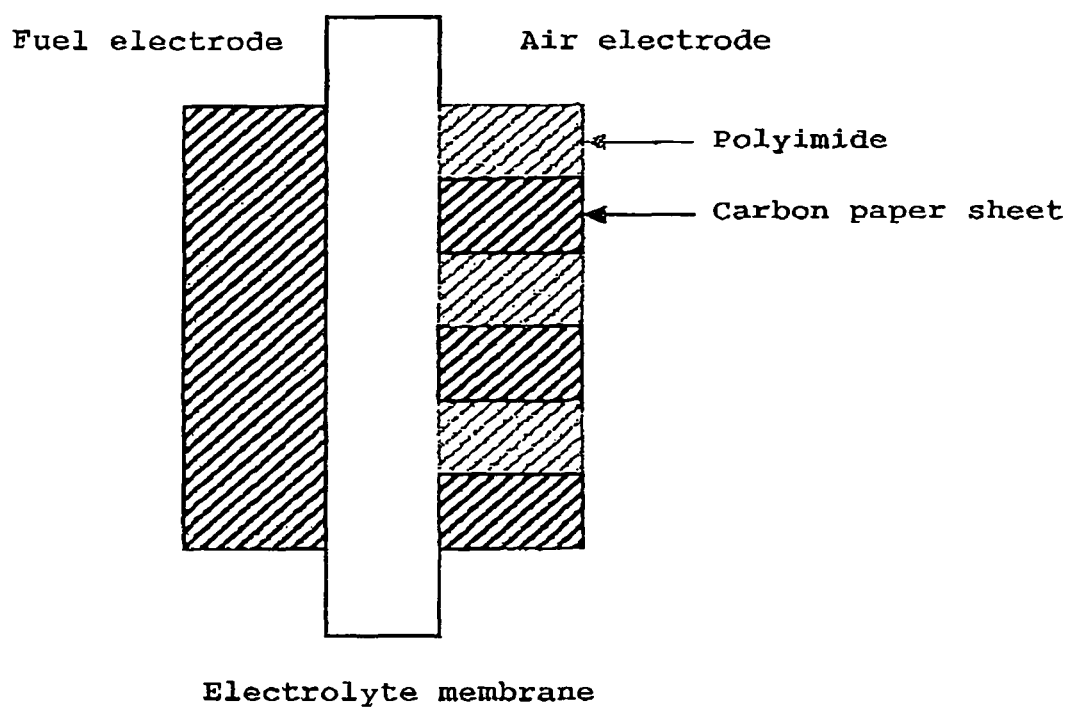
FIG. 16 is a schematic diagram for showing an example of making the gas diffusion layer of the air electrode inhomogeneous by using different materials in combination.

An MEA was fabricated in the same way as in Example 1 except that polyimide sheets (air shutoff layer) of 10 mm wide and carbon paper sheets (air permeable layer: gas diffusion layer with fuel electrode catalyst) of 10 mm wide were alternately arranged, as shown in FIG. 16, on the air electrode side of the electrolyte membrane, a carbon paper (gas diffusion layer with fuel electrode catalyst) was arranged on the fuel electrode side of the electrolyte membrane, and these sheets were assembled to be hot pressed at 140° C. under a pressure of 10 MPa. The thickness of the polyimide sheet was 130 μm both before and after being pressed, and the thickness of the carbon paper sheet was 280 μm before being pressed and 165 μm after being pressed (polyimide sheet restores to its original state even after being pressed). The thicknesses of the catalyst layers of the air electrode and the fuel electrode after being pressed were about 30 μm, respectively.

Using the MEA fabricated as described above, a hydrogen generating cell was fabricated in the same way as in EXAMPLE 1, and the evolution volume of the gas generated on the fuel electrode side was measured in the same way as in Example 1.

The result is shown in Table 7:

TABLE 7

| Air flow Rate/ml/min | Open-circuit voltage/mV | Gas evolution rate/ml/min | Hydrogen concentration/% | Hydrogen evolution rate/ml/min |
|---|---|---|---|---|
| 10 | 473 | trace | 55.5 | trace |
| 20 | 488 | 0.1 | 60.1 | 0.060 |
| 30 | 517 | trace | 48.7 | trace |
| 40 | 534 | 0 | 0.0 | 0.000 |
| 50 | 578 | 0 | 0.0 | 0.000 |

As shown in Table 7, generation of hydrogen was confirmed on the fuel electrode side of the cell at an open-circuit voltage of around 500 mV with reduction of the flow rate of air also when different materials were used in combination to make the gas diffusion layer of the air electrode inhomogeneous.

Example 6

Now, there will be described an example of forming a region of insufficient air supply on the air electrode side by forming the gas diffusion layer of the air electrode into sparse and dense regions in combination to make the gas diffusion layer of the air electrode inhomogeneous instead of performing masking on part of the gas diffusion layer.

An MEA was fabricated in the same way as in Example 1 except that thin carbon paper sheets of 10 mm wide and 190 μm thick (gas diffusion layers with air electrode catalyst) and thick carbon sheets of 10 mm wide and 335 μm thick (gas diffusion layer with air electrode catalyst) were arranged alternately on the air electrode side of the electrolyte membrane, a thin carbon paper of 190 μm thick (gas diffusion layer with fuel electrode catalyst) was arranged on the fuel electrode side of the electrolyte membrane, and these sheets were assembled to be hot pressed at 140° C. under the same pressure (10 MPa) (simultaneous pressing). The thicknesses of the thin and thick carbon paper sheets as the gas diffusion layers of the air electrode were varied from 190 μm before being pressed to 165 μm after being pressed and from 335 μM before being pressed to 185 μm after being pressed, respectively. The thin and thick carbon paper sheets were substantially the same in thickness, thereby forming a carbon paper sheet having sparse and dense regions (thin carbon paper sheets→sparse regions, thick carbon paper sheet→dense regions) in combination, as shown in FIG. 17. The thicknesses of the catalyst layers of the air electrode and the fuel electrode after being pressed were about 30 μm, respectively.

Using the MEA fabricated as described above, a hydrogen generating cell was fabricated in the same way as in Example 1, and the evolution volume of the gas generated on the fuel electrode side was measured under the same conditions as in Example 1 except that the flow rate of air flowed to the air electrode side was set to a range of 10 to 90 ml/min.

The result is shown in Table 8:

TABLE 8

| Air flow Rate/ml/min | Open-circuit voltage/mV | Gas evolution rate/ml/min | Hydrogen concentration/% | Hydrogen evolution rate/ml/min |
|---|---|---|---|---|
| 10 | 391 | trace | 50.5 | trace |
| 30 | 468 | 0.1 | 53.2 | 0.053 |
| 50 | 499 | 0.12 | 57.7 | 0.069 |
| 70 | 521 | trace | 0.0 | trace |
| 90 | 587 | 0 | 0.0 | 0.000 |

As shown in Table 8, generation of hydrogen was confirmed on the fuel electrode side of the cell at an open-circuit voltage of around 500 mV with reduction of the flow rate of air also when the gas diffusion layer of the air electrode were formed into sparse and dense regions in combination to make the gas diffusion layer of the air electrode inhomogeneous. Hydrogen was generated at a slightly higher flow rate of air than in Example 5 of using different materials in combination to make the gas diffusion layer of the air electrode inhomogeneous.

Example 7

Now, there will be described an example of forming a region of insufficient air supply on the air electrode side by forming the surface of the gas diffusion layer of the air electrode into irregularities to make the gas diffusion layer of the air electrode inhomogeneous instead of performing masking on part of the gas diffusion layer.

Figure 18:
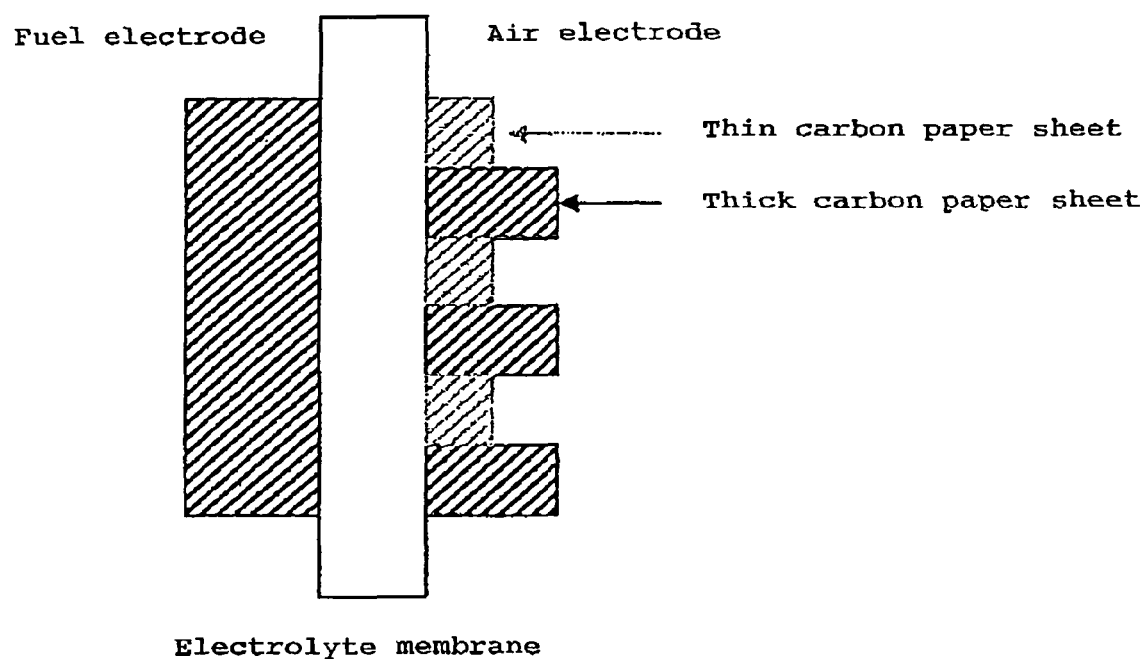
FIG. 18 is a schematic diagram for showing an example of forming irregularities on the surface of the gas diffusion layer of the air electrode to make the gas diffusion layer of the air electrode inhomogeneous.

An MEA was fabricated in the same way as in Example 1 except that thin carbon paper sheets of 10 mm wide and 190 μm thick (gas diffusion layers with air electrode catalyst) were arranged on the air electrode side of the electrolyte membrane with clearance gaps of 10 mm being provided, a thin carbon paper sheet of 190 μm thick (gas diffusion layer with air electrode catalyst) was arranged on the entire surface of the fuel electrode side of the electrolyte membrane, and these sheets were hot pressed at 140° C. under a press pressure of 10 MPa, followed by arranging thick carbon paper sheets of 10 mm wide and 335 μm thick (gas diffusion layer with air electrode catalyst) in the clearance gaps and hot-pressing at 140° C. under a press pressure of 10 MPa (two-step pressing). The thicknesses of the thin and thick carbon paper sheets as the gas diffusion layers of the air electrode were varied from 190 μm before being pressed to 140 μm after being pressed and from 335 μm before being pressed to 215 μm after being pressed, respectively. The thin and thick carbon paper sheets were substantially the same in thickness, thereby forming a carbon paper sheet having irregularities (thin carbon paper sheets→concave regions, thick carbon paper sheet→convex regions), as shown in FIG. 18. The thicknesses of the catalyst layers of the air electrode and the fuel electrode after being pressed were about 30 μm, respectively.

Using the MEA fabricated as described above, a hydrogen generating cell was fabricated in the same way as in Example 1, and the evolution volume of the gas generated on the fuel electrode side was measured under the same conditions as in Example 1 except that the flow rate of air flowed to the air electrode side was set to a range of 10 to 90 ml/min.

The result is shown in Table 9:

TABLE 9

| Air flow Rate/ml/min | Open-circuit voltage/mV | Gas evolution rate/ml/min | Hydrogen concentration/% | Hydrogen evolution rate/ml/min |
|---|---|---|---|---|
| 10 | 387 | trace | 45.5 | trace |
| 30 | 442 | trace | 49.5 | trace |
| 50 | 487 | 0.1 | 55.8 | 0.056 |
| 70 | 579 | 0 | 0.0 | 0.000 |
| 90 | 591 | 0 | 0.0 | 0.000 |

As shown in Table 9, generation of hydrogen was confirmed on the fuel electrode side of the cell at an open-circuit voltage of around 500 mV with reduction of the flow rate of air also when the surface of the gas diffusion layer of the air electrode were formed into irregularities to make the surface of the gas diffusion layer of the air electrode inhomogeneous. Hydrogen was generated at a slightly higher flow rate of air than in Example 5 of using different materials in combination to make the gas diffusion layer of the air electrode inhomogeneous similarly to Example 6 of forming sparse and dense regions in combination to make the gas diffusion layer of the air electrode inhomogeneous.

INDUSTRIAL APPLICABILITY

As described above, the hydrogen generating device of the present invention can generate a gas containing hydrogen by decomposing a fuel containing an organic compound at 100° C. or lower, it can easily supply hydrogen to the fuel cell. Moreover, since the fuel cell power generating device using the hydrogen generating device of the present invention does not require special means for protecting the control device incorporated in the package from heat generated by the hydrogen generating device and moreover, heat generated by the entire device including the fuel cell is small, the fuel cell power generating device is extremely advantageous to be used as a mobile power source or a on-site power source and also to be incorporated into an electric automobile or a submergible ship.

Further, using the hydrogen generating device of the present invention, hydrogen can be easily supplied to a hydrogen storage tank for supplying hydrogen to a hydrogen storage container incorporated in an electric automobile (fuel cell automobile) or to a fuel cell automobile. In addition, when hydrogen is used as a processing gas or the like in manufacturing semiconductor devices, hydrogen can be easily supplied to a processing site by providing a hydrogen storage means.

The invention claimed is:

1. A hydrogen generating device for generating a gas containing hydrogen by decomposing a fuel containing an organic compound, comprising:
a partition membrane;
a fuel electrode provided on one surface of the partition membrane;
means for supplying a fuel containing the organic compound and water to the fuel electrode;
an oxidizing electrode provided on other surface of the partition membrane;
means for supplying an oxidizing agent to the oxidizing electrode;
means for generating and collecting the gas containing hydrogen from the fuel electrode;
a gas diffusion layer formed on the oxidizing electrode;
another gas diffusion layer formed on the fuel electrode;
a first region including a masking part masking a part of the gas diffusion layer of the oxidizing electrode and a non-masking part not masking a part of the another gas diffusion layer of the fuel electrode, the non-masking part facing the masking part at a corresponding position thereof over the partition membrane;
a second region that the masking part is absent both on the gas diffusion layer of the oxidizing electrode and the another gas diffusion layer of the fuel electrode at another corresponding position thereof over the partition membrane, and
a third region including the masking part of the gas diffusion layer of the oxidizing electrode and another masking part masking a part of the another gas diffusion layer of the fuel electrode, the masking part of the gas diffusion layer of the oxidizing electrode facing the another masking part of the another gas diffusion layer of the fuel electrode,
wherein the masking part on the gas diffusion layer of the oxidizing electrode is a low oxidizing agent supply region where supply of the oxidizing agent is substantially lower than a part that the masking part is absent, and
the low oxidizing agent supply region is provided with the masking part of the oxidizing electrode and the another masking part of the fuel electrode displaced on at least parts of the masking part and the another masking part from each other on opposing surfaces thereof.

2. The hydrogen generating device according to claim 1, wherein the low oxidizing agent supply region is provided without an oxidizing electrode separator provided with a channel groove for flowing the oxidizing agent therethrough.

3. The hydrogen generating device according to claim 1, wherein the masking part is formed in a strip-shaped mask.

4. The hydrogen generating device according to claim 1, wherein the masking part is formed in a spot-shaped mask.

5. The hydrogen generating device according to claim 1, wherein the masking part is formed with a resin on a surface of the gas diffusion layer.

6. The hydrogen generating device according to claim 1, wherein the masking part is formed by screen printing.

7. The hydrogen generating device according to claim 1, wherein the low oxidizing agent supply region is formed with the gas diffusion layer of the oxidizing electrode which is formed non-uniformly.

8. The hydrogen generating device according to claim 7, wherein the gas diffusion layer of the oxidizing electrode is formed sparsely and densely or formed with a combination of different materials such that the gas diffusion layer is formed non-uniformly.

9. The hydrogen generating device according to claim 7, wherein irregularities are formed on a surface of the gas diffusion layer of the oxidizing electrode such that the gas diffusion layer of the oxidizing electrode is formed non-uniformly.

10. The hydrogen generating device according to claim 1, wherein the device is an open circuit having neither means for withdrawing electric energy to outside from a hydrogen generating cell constituting the hydrogen generating device, nor means for providing electric energy from outside to the hydrogen generating cell.

11. The hydrogen generating device according to claim 1, further comprising means for withdrawing electric energy to outside with the fuel electrode serving as a negative electrode and the oxidizing electrode as a positive electrode.

12. The hydrogen generating device according to claim 1, further comprising means for providing electric energy from outside with the fuel electrode serving as cathode and the oxidizing electrode as anode.

13. The hydrogen generating device according to claim 1, wherein a voltage between the fuel electrode and the oxidizing electrode is 400 to 600 mV.

14. The hydrogen generating device according to claim 1, wherein an evolution volume of the gas containing hydrogen is adjusted by varying a voltage between the fuel electrode and the oxidizing electrode.

15. The hydrogen generating device according to claim 1, wherein a voltage between the fuel electrode and the oxidizing electrode and/or an evolution volume of the gas containing hydrogen are/is adjusted by varying a volume of oxidizing agent supply.

16. The hydrogen generating device according to claim 1, wherein an operation temperature is 100° C. or lower.

17. The hydrogen generating device according to claim 1, wherein the organic compound supplied to the fuel electrode is one or more organic compounds selected from the group consisting of alcohol, aldehyde, carboxylic acid, and ether.

18. The hydrogen generating device according claim 17, wherein the alcohol is methanol.

19. The hydrogen generating device according to claim 1, wherein the oxidizing agent supplied to the oxidizing electrode is an oxygen-containing gas or oxygen.

20. The hydrogen generating device according to claim 1, wherein the partition membrane is a proton conducting solid electrolyte membrane.

21. The hydrogen generating device according to claim 20, wherein the proton conducting solid electrolyte membrane is a perfluorocarbon sulfonate-based solid electrolyte membrane.

22. The hydrogen generating device according claim 1, wherein a catalyst of the fuel electrode is made of platinum-ruthenium alloy supported by carbon powder serving as a base.

23. The hydrogen generating device according to any claim 1, wherein a catalyst of the oxidizing electrode is made of platinum supported by carbon powder serving as a base.

24. The hydrogen generating device according to claim 1, further comprising means for circulating fuel containing the organic compound.

25. The hydrogen generating device according to claim 1, further comprising a carbon dioxide absorbing portion for absorbing carbon dioxide contained in the gas containing hydrogen.

26. A fuel cell power generating device, comprising:
a fuel cell; and
the hydrogen generating device according to claim 1 connected to the fuel cell,
wherein a gas containing hydrogen generated by the hydrogen generating device is supplied to the fuel cell.

27. The fuel cell power generating device according to claim 26, wherein the fuel cell, the hydrogen generating device for generating the gas containing hydrogen to be supplied to the fuel cell, a power converting device for converting a direct-current power generated by the fuel cell to a predetermined power, and a control device for control of an entire generating device are incorporated in a package.

28. The fuel cell power generating device according to claim 26, wherein the gas containing hydrogen generated from the hydrogen generating device is supplied to the fuel cell without being cooled.

29. The fuel cell power generating device according to claim 26, wherein two or more of hydrogen generating devices are combined in the fuel cell power generating device,
wherein the two or more of hydrogen generating devices are selected from the group consisting of
a hydrogen generating device which is an open circuit having neither means for withdrawing electric energy to outside from a hydrogen generating cell nor means for providing electric energy from outside to the hydrogen generating cell,
a hydrogen generating device having means for withdrawing electric energy to outside with the fuel electrode serving as a negative electrode and the oxidizing electrode as a positive electrode, and
a hydrogen generating device having means for providing electric energy from outside with the fuel electrode serving as cathode and the oxidizing electrode as anode.

30. The fuel cell power generating device according to claim 26, wherein the oxidizing agent supplied to the oxidizing electrode of the hydrogen generating device is an exhaust air exhausted from the fuel cell or the hydrogen generating device or a gas containing unreacted oxygen.

31. The fuel cell power generating device according to claim 26, wherein an insulating material for insulating a heat generated by the hydrogen generating device is not provided.

32. An electric automobile, comprising: the fuel cell power generating device according to claim 26.

33. A submergible ship, comprising: the fuel cell power generating device according to claim 26.

34. A hydrogen supply system, comprising:
hydrogen storage means; and
the hydrogen generating device according to claim 1 connected to the hydrogen storage means,
wherein the gas containing hydrogen generated by the hydrogen generating device is supplied to the hydrogen storage means.

35. The hydrogen supply system according to claim 34, wherein the hydrogen storage means is a hydrogen storage container incorporated in an electric automobile.

* * * * *